United States Patent
Kawasaki et al.

(10) Patent No.: US 9,523,000 B2
(45) Date of Patent: Dec. 20, 2016

(54) POLYESTER FILM

(71) Applicant: MITSUBISHI PLASTICS, INC., Tokyo (KE)

(72) Inventors: Taishi Kawasaki, Maibara (JP); Ryosuke Funatsu, Maibara (JP); Katsuya Amako, Maibara (JP); Yuka Kato, Maibara (JP); Masato Fujita, Maibara (JP)

(73) Assignee: MITSUBISHI PLASTICS, INC., Tokyo (JP)

( * ) Notice: Subject to any disclaimer, the term of this patent is extended or adjusted under 35 U.S.C. 154(b) by 318 days.

(21) Appl. No.: 14/350,491

(22) PCT Filed: Oct. 11, 2012

(86) PCT No.: PCT/JP2012/076338
§ 371 (c)(1),
(2) Date: Apr. 8, 2014

(87) PCT Pub. No.: WO2013/058164
PCT Pub. Date: Apr. 25, 2013

(65) Prior Publication Data
US 2014/0329101 A1 Nov. 6, 2014

(30) Foreign Application Priority Data

Oct. 19, 2011 (JP) .................. 2011-229309
Oct. 22, 2011 (JP) .................. 2011-232314
Oct. 25, 2011 (JP) .................. 2011-233463

(51) Int. Cl.
*C08L 67/02* (2006.01)
*B32B 27/36* (2006.01)
*C08K 3/36* (2006.01)
*C08J 7/04* (2006.01)

(52) U.S. Cl.
CPC ............... *C08L 67/02* (2013.01); *B32B 27/36* (2013.01); *C08J 7/042* (2013.01); *C08K 3/36* (2013.01); *B32B 2255/10* (2013.01); *C08J 2367/02* (2013.01); *C08J 2467/02* (2013.01); *Y10T 428/31786* (2015.04)

(58) Field of Classification Search
CPC ...................................... G11B 5/72
USPC ..................................... 428/480
See application file for complete search history.

(56) References Cited

U.S. PATENT DOCUMENTS 5,362,571 A * 11/1994 Chujo ................ B32B 27/36
428/480
2012/0328868 A1 12/2012 Kawasaki et al.

FOREIGN PATENT DOCUMENTS

| GB | 1401305 | * | 9/1972 | |
| GB | 1401305 | * | 7/1975 | ............ G11B 5/735 |
| JP | 63-249650 | | 10/1988 | |
| JP | 64-41108 | | 2/1989 | |
| JP | 7-47761 | | 2/1995 | |
| JP | H08-290540 | | 11/1996 | |
| JP | 11-348211 | | 12/1999 | |
| JP | 2001-096696 | | 4/2001 | |
| JP | 2008-23718 | | 2/2008 | |
| JP | 2010-131937 | | 6/2010 | |
| KR | 10-2004-0020259 | | 3/2004 | |
| WO | 2008/016173 | | 2/2008 | |
| WO | 2011/096492 | | 8/2011 | |

OTHER PUBLICATIONS

International Search Report for PCT/JP2012/076338, mailed Jan. 8, 2013.
European Patent Office, "Communication with Extended European Search Report," (8 pages) issued in connection with European Patent Application No. 12842068.4, dated May 27, 2015.

* cited by examiner

*Primary Examiner* — Terressa Boykin
(74) *Attorney, Agent, or Firm* — Nixon & Vanderhye P.C.

(57) ABSTRACT

The present invention provides a polyester film that can be suitably used in the applications requiring excellent transparency and slipping property, for example, such as a film member for a transparent electrode used in touch panels, etc., and a member for molding films. The present invention relates to a polyester film comprising non-heat-resistant particles supported thereon, in which after supporting the non-heat-resistant particles on at least one surface of an unstretched polyester film, the unstretched polyester film is stretched in at least one direction thereof, and a process for producing a polyester film comprising the steps of blowing non-heat-resistant particles onto at least one surface of an unstretched polyester film to support the non-heat-resistant particles thereon, or applying a coating solution comprising the non-heat-resistant particles onto at least one surface of the unstretched polyester film to support the non-heat-resistant particles thereon; and then stretching the unstretched polyester film in at least one direction thereof.

13 Claims, No Drawings

POLYESTER FILM

This application is the U.S. national phase of International Application No. PCT/JP2012/076338, filed on Oct. 11, 2012, which designated the U.S. and claims priority to Japan Application Nos. 2011-229309 filed on Oct. 19, 2011; 2011-232314, filed on Oct. 22, 2011; and 2011-233463, filed on Oct. 25, 2011, the entire contents of each of which are hereby incorporated by reference.

TECHNICAL FIELD

The present invention relates to a polyester film, and more particularly, to a polyester film having an excellent transparency.

BACKGROUND ART

Polyester films have been used in various applications such as touch panels, prism lens films, micro-lens films, light diffusion films, anti-reflective films, hard coat films, electromagnetic shielding films, molding base materials or the like because of excellent transparency and strength thereof. In recent years, it has been required that the polyesters films, in particular, those polyester films used in the applications in which a surface functional layer such as a hard coat layer should be formed thereon, such as members of displays for touch panels, in-mold transfer films and in-mold label films, have a more excellent transparency.

Conventionally, there is generally known the method in which particles are incorporated into a polyester film for the purpose of imparting a good easy-slipping property to the film (Patent Documents 1 and 2). However, in the case where the particles are incorporated into the polyester film, the resulting film tends to exhibit a high haze and therefore tends to have a whitish appearance, or tends to have a feel of grains due to the particles incorporated therein and therefore tends to be deteriorated in visibility when viewed under a fluorescent lamp.

To solve these problems, there has been proposed a polyester film comprising no particles (Patent Document 3). However, the polyester film comprising no particles tends to have such a drawback that the film has a poor slipping property and therefore is readily injured. There has been proposed the method in which a coating layer comprising particles is formed on a monoaxially stretched polyester film to impart a slip property thereto. However, the polyester film is not improved in slip property before forming the coating layer thereon, and therefore tends to be unavoidably injured owing to the poor slip property between the step of forming the film by melt-extrusion and the step of applying the coating solution thereto.

CITATION LIST

Patent Literature

Patent Document 1: Japanese Patent Application Laid-Open (KOKAI) No. 2006-169467
Patent Document 2: Japanese Patent Application Laid-Open (KOKAI) No. 2006-77148
Patent Document 3: Japanese Patent Application Laid-Open (KOKAI) No. 2000-229355

SUMMARY OF THE INVENTION

Problems to be Solved by the Invention

The present invention has been accomplished to solve the above conventional problems. An object of the present invention is to provide a polyester film having an excellent transparency and a good slipping property.

Means for Solving Problems

As a result of the present inventors' earnest study in view of the above problems, it has been found that these problems can be readily solved by using a polyester film having a specific structure. The present invention has been attained on the basis of this finding.

That is, in aspects of the present invention, there are provided a polyester film comprising non-heat-resistant (heat-labile) particles supported thereon, in which after supporting the non-heat-resistant particles on at least one surface of an unstretched polyester film, the unstretched polyester film is stretched in at least one direction thereof, and a process for producing a polyester film comprising the steps of blowing non-heat-resistant particles onto at least one surface of an unstretched polyester film to support the non-heat-resistant particles thereon, or applying a coating solution comprising non-heat-resistant particles onto at least one surface of an unstretched polyester film to support the non-heat-resistant particles thereon; and then stretching the unstretched polyester film in at least one direction thereof.

Effect of the Invention

In accordance with the present invention, there can be provided a polyester film that is excellent in transparency and slipping property and therefore can exhibit an excellent visibility when laminating various surface functional layers such as a hard coat layer thereon. Therefore, the present invention has a high industrial value.

PREFERRED EMBODIMENTS FOR CARRYING OUT THE INVENTION

The polyester film constituting the polyester film of the present invention may have either a single layer structure or a multilayer structure. Unless departing from the scope of the present invention, the polyester film may have not only a two or three layer structure but also a four or more multilayer structure, and the layer structure of the polyester film is not particularly limited thereto. For example, the polyester film may have a three layer structure from the standpoint of improving various properties of the film by changing kinds of raw materials of surface layers and intermediate layer thereof from each other, e.g., for the purpose of preventing deposition of oligomers on the surface of the film by using a low-oligomerized polyester film as a raw material of the surface layers, etc.

The polyester used in the present invention may be in the form of either a homopolyester or a copolyester. The homopolyester is preferably obtained by polycondensing an aromatic dicarboxylic acid and an aliphatic glycol. Examples of the aromatic dicarboxylic acid include terephthalic acid and 2,6-naphthalenedicarboxylic acid. Examples of the aliphatic glycol include ethylene glycol, diethylene glycol and 1,4-cyclohexanedimethanol. Typical examples of the polyesters include polyethylene terephthalate or the like. On the other hand, as a dicarboxylic acid component of the copolyester, there may be mentioned at least one compound selected from the group consisting of isophthalic acid, phthalic acid, terephthalic acid, 2,6-naphthalenedicarboxylic acid, adipic acid, sebacic acid and oxycarboxylic acids (such as, for example, p-oxybenzoic acid). As a glycol component of the copolyester, there may be mentioned at least one compound selected from the group consisting of ethylene glycol, diethylene glycol, propylene glycol, butanediol, 4-cyclohexanedimethanol and neopentyl glycol.

The polymerization catalyst for production of the polyester is not particularly limited, and any conventionally known compounds may be used as the polymerization catalyst. Examples of the polymerization catalyst include an antimony compound, a titanium compound, a germanium compound, a manganese compound, an aluminum compound, a magnesium compound and a calcium compound. Among these compounds, in particular, from the standpoint of a high brightness of the resulting film, preferred is the titanium compound.

For the purpose of mainly imparting an easy-slipping property to the polyester film and preventing occurrence of flaws on the polyester film in the respective steps, the polyester layer of the film according to the present invention may also comprise particles. From the viewpoint of a transparency of the resulting film, the polyester layer preferably comprises no particles. If the particles are compounded in the polyester layer, the kinds of the particles compounded in the polyester layer are not particularly limited as long as they are capable of imparting a easy-slipping property to the resulting film. Specific examples of the particles include inorganic particles such as particles of silica, calcium carbonate, magnesium carbonate, barium carbonate, calcium sulfate, calcium phosphate, magnesium phosphate, kaolin, aluminum oxide and titanium oxide; and organic particles such as particles of acrylic resins, styrene resins, urea resins, phenol resins, epoxy resins and benzoguanamine resins. Further, there may also be used deposited particles obtained by precipitating and finely dispersing a part of metal compounds such as a catalyst during the process for production of the polyester.

Also, in the case where the particles are compounded in the polyester layer, the average particle diameter of the particles is usually not more than 3 μm, and preferably in the range of 0.01 to 1.5 μm. When the average particle diameter of the particles is more than 3 μm, the resulting film tends to be deteriorated in transparency, or tends to suffer from feel of grains due to presence of the particles and therefore tends to be deteriorated in visibility.

The content of the particles in the polyester layer containing the particles in the polyester film may vary depending upon the average particle diameter thereof, and is usually in the range of not more than 1000 ppm, preferably not more than 500 ppm, and more preferably not more than 50 ppm (i.e., it is not intended that the particles are incorporated in the polyester layer). When the content of the particles in the polyester layer is more than 1000 ppm, the resulting film tends to be deteriorated in transparency, or tends to suffer from feel of grains due to presence of the particles and therefore tends to be deteriorated in visibility.

The shape of the particles used in the polyester layer is also not particularly limited, and may be any of a spherical shape, a massive shape, a bar shape, a flat shape, etc. Further, the hardness, specific gravity, color and the like of the particles are also not particularly limited. These particles may be used in combination of any two or more kinds thereof, if required.

The method of adding the particles to the polyester layer is not particularly limited, and any conventionally known methods can be suitably used therefor. For example, the particles may be added at any optional stages in the process for producing the polyester forming the respective layers. The particles are preferably added to the polyester after completion of the esterification reaction or transesterification reaction.

The polyester film according to the present invention may also comprise an ultraviolet absorber in order to improve a weathering resistance of the film, for example, prevent deterioration in liquid crystals of liquid crystal displays used in touch panels and the like. The ultraviolet absorber is not particularly limited as long as it is a compound that is capable of absorbing an ultraviolet ray and can withstand heat applied during a process for producing the polyester film.

As the ultraviolet absorber, there are generally known an organic ultraviolet absorber and an inorganic ultraviolet absorber. In view of a good transparency of the resulting film, among these ultraviolet absorbers, the organic ultraviolet absorber is preferred. Examples of the organic ultraviolet absorber include, but are not particularly limited to, cyclic iminoester-based ultraviolet absorbers, benzotriazole-based ultraviolet absorbers and benzophenone-based ultraviolet absorbers. Among these organic ultraviolet absorbers, cyclic iminoester-based ultraviolet absorbers and benzotriazole-based ultraviolet absorbers are more preferred in view of a good durability. These ultraviolet absorbers may be used in combination of any two or more thereof.

Meanwhile, the polyester film according to the present invention may also comprise, in addition to the above particles and ultraviolet absorbers, conventionally known additives such as an antioxidant, an antistatic agent, a thermal stabilizer, a lubricant, a dye, a pigment, etc., if required.

The thickness of the polyester film according to the present invention is not particularly limited, and the polyester film may have any thickness as long as the film can be formed while maintaining a suitable film shape. The thickness of the polyester film is usually in the range of 10 to 300 μm and preferably 25 to 250 μm.

Next, an example of the process of producing the polyester film according to the present invention is more specifically explained, although the present invention is not particularly limited thereto. That is, in the production process, there is preferably used such a method in which pellets obtained by drying the above-mentioned raw polyester material are extruded from a die using a single-screw extruder in the form of a molten film, and the molten film is cooled and solidified on a chilled roll to obtain an unstretched film. In this case, in order to enhance a flatness of the obtained film, it is preferred to enhance adhesion between the film and the rotary chilled drum. For this purpose, an electrostatic pinning method or a liquid coating adhesion method is preferably used. Next, the thus obtained unstretched film is biaxially stretched. In such a case, first, non-heat-resistant particles are supported on the unstretched film, and the unstretched film was stretched in one direction thereof using a roll-type or tenter-type stretching machine. The stretching temperature is usually 70 to 120° C. and preferably 80 to 110° C., and the stretching ratio is usually 2.5 to 7 times and preferably 3.0 to 6 times. Next, the thus stretched film is further stretched in the direction perpendicular to the stretching direction of the first stage. In this case, the stretching temperature is usually 70 to 170° C., and the stretching ratio is usually 3.0 to 7 times and preferably 3.5 to 6 times. Successively, the resulting biaxially stretched film is heat-set at a temperature of 180 to 270° C. under a tension or under relaxation within 30% to obtain a biaxially oriented film. Upon the above stretching steps, there may also be used the method in which the stretching in each direction is carried out in two or more stages. In such a case, the multi-stage stretching is preferably performed such that the total stretching ratio in each of the two directions finally falls within the above-specified range.

Also, upon producing the polyester film constituting the polyester film according to the present invention, there may also be used a simultaneous biaxial stretching method. The simultaneous biaxial stretching method is such a method in which after supporting the non-heat-resistant particles on the unstretched film, the unstretched film is stretched and oriented in both of the machine and width directions at the same time while maintaining the film in a suitable temperature-controlled condition at a temperature of usually 70 to 120° C. and preferably 80 to 110° C. The stretching ratio used in the simultaneous biaxial stretching method is 4 to 50 times, preferably 7 to 35 times and more preferably 10 to 25 times in terms of an area ratio of the film to be stretched. Successively, the obtained biaxially stretched film is heat-set at a temperature of 170 to 270° C. under a tension or under relaxation within 30% to obtain a stretched oriented film. As the apparatus used in the above simultaneous biaxial stretching method, there may be employed any conventionally known stretching apparatuses such as a screw type stretching apparatus, a pantograph type stretching apparatus and a linear drive type stretching apparatus.

In the present invention, it is essentially required that the non-heat-resistant (heat-labile) particles are supported on at least one surface of the unstretched polyester film, and then the unstretched polyester film on which the non-heat-resistant particles are supported is stretched in at least one direction thereof.

As the method of incorporating the particles into the polyester film and ensuring a transparency and a slipping property thereof, the present inventors have made various studies on variation in average particle diameter of the particles, variation in amount of the particles added, variation in thickness of a layer comprising the particles in the polyester film (i.e., a method of ensuring a slipping property while enhancing a transparency by a three layer structure in which the particles are incorporated into only an outermost surface layer), etc. However, as a result, in any of the above methods, it may be difficult to ensure both a high transparency and a sufficient slipping property.

The non-heat-resistant particles of the present invention are supported on the unstretched polyester film at an initial stage of the film production process and thereby used to ensure a sufficient slipping property through various steps from the stage of the unstretched film formed after melt-extrusion of polyester to the stage before the high-temperature treatment.

In addition, if any particles are present in the polyester film, the resulting film tends to look whitely by scattering of light thereon. On the other hand, it has been found that when using the non-heat-resistant particles in the polyester film, the particles can be melted at a high temperature in subsequent steps to reduce a particle diameter thereof, deform their shape, or eliminate the particle shape, thereby suppressing a whitish appearance of the film. Thus, it is possible to achieve a high transparency of the polyester film.

The method of supporting the non-heat-resistant particles on the unstretched polyester film is not particularly limited as long as the non-heat-resistant particles can be held on the film, and there may be used the method of directly applying the non-heat-resistant particles onto the film, the method of applying a coating solution prepared by dispersing the non-heat-resistant particles in a liquid, etc., onto the film, or the like. As the method of directly applying the non-heat-resistant particles onto the film, there may be mentioned, for example, the method of blowing the particles onto the film maintained at a certain temperature, the method of adhering a mixture of the particles with an adhesive compound onto the film, or the like. As the coating method, there may be used conventionally known coating methods. As a coating object to be applied, there may be mentioned, for example, a coating liquid comprising the particles only or a coating liquid further comprising a polymer, etc. From the standpoint of effectively retaining the particles on the film, the coating method can be more suitably used.

Also, the non-heat-resistant particles may be supported on the film at an optional stage from the stage of the unstretched film formed after melt-extrusion of polyester to the stage before the high-temperature treatment. In particular, in order to prevent the film from being damaged by contact with rolls, the non-heat-resistant particles are preferably supported on the film at an initial stage of the film production process. In addition, in the method of stretching the film by contacting with rolls, etc., since the degree of damage to the film may become large, it is preferred that the non-heat-resistant particles are supported on the film at a stage before being stretched.

Further, in order to melt the non-heat-resistant particles in subsequent steps to reduce a particle diameter thereof, deform their shape or eliminate the particle shape, the non-heat-resistant particles are preferably treated at a high temperature exceeding a heat-resisting temperature (heat-deforming temperature) to obtain a film having a high transparency.

The method of supporting the non-heat-resistant particles is not particularly limited. For example, in the case of a sequential biaxial stretching method, after forming the unstretched film, the non-heat-resistant particles are supported thereon an initial stage of the method, and then the unstretched film is subjected to first stretching step and further to second stretching step, followed by subjecting the thus biaxially stretched film to high-temperature treatment, thereby producing a more suitable polyester film.

In the present invention, the non-heat-resistant particles may be supported on either one surface of the film, for example, in order to overcome a portion that is more susceptible to damage, or both surfaces thereof. In addition, in the case where the non-heat-resistant particles are supported on both surfaces of the film, the respective supporting steps may be conducted at the same time or separately at the different times.

The non-heat-resistant (heat-labile) particles used in the present invention are particles having a low heat resistance which undergo deformation at a high temperature. In particular, in the production process of the polyester film, the non-heat-resistant particles are deformed or melted in the high-temperature step after forming the film. However, for example, in the case where the method of stretching the film by contacting with rolls, etc., is selected as the first stretching method, since the particles must retain their sufficient particulate shape in the stretching step, it is required that the particles have a heat resistance to a certain extent.

That is, it is required that the non-heat-resistant particles preferably have such a thermal characteristic that they cause no thermal deformation at a temperature lower than 120° C. but undergo thermal deformation at a temperature of not lower than 120° C. to some extent.

The softening point of the non-heat-resistant particles is preferably in the range of 120 to 270° C., more preferably 150 to 250° C., and still more preferably 180 to 230° C. When the softening point of the non-heat-resistant particles is lower than 120° C., in the case where the method of stretching the film by contacting with rolls, etc., is selected as the first stretching method, the particles tend to suffer from thermal deformation depending upon the stretching temperature used, so that there tends to occur such a fear that the film is deteriorated in slipping property. On the other hand, when the softening point of the non-heat-resistant particles is higher than 270° C., the particles tend to cause no thermal deformation even in the final product, so that the resulting film tends to still have a whitish appearance.

The non-heat-resistant particles are not particularly limited as long as they can maintain the above thermal characteristic. However, from the standpoint of readily achieving the above thermal characteristic, in general, organic particles are more suitably used as compared to inorganic particles, namely, non-heat-resistant organic particles are preferably used. In addition, in view of well-controlled size and shape of the particles as well as a good dispersibility of the particles in various solvents such as water, the organic particles are preferably of a polymer type, that is, in the form of non-heat-resistant polymer particles.

As the non-heat-resistant polymer particles, there may be used polymer particles of a crosslinked type or a non-crosslinked type unless the aimed effects of the present invention is adversely affected thereby. However, in order to control the thermal characteristic of the non-heat-resistant particles so as to further meet the object of the present invention, the non-crosslinked type particles, i.e., non-heat-resistant non-crosslinked polymer particles are more preferred.

The no-crosslinked structure of the non-heat-resistant non-crosslinked polymer particles means that the polymer particles have no three-dimensional structure or a less three-dimensional structure, and exhibit a low heat resistance. For example, in the case where the particles are formed from the below-mentioned polymerizable monomers, the crosslinking polymerizable monomers are preferably used in an amount of less than 5% by weight and more preferably less than 1% by weight based on a total weight of whole polymerizable monomers used in the particles.

As the polymer constituting the non-heat-resistant non-crosslinked polymer particles, there may be used conventionally known polymer compounds. Examples of the polymer compounds include acrylic resins, styrene resins, vinyl resins, epoxy resins, urea resins, phenol resins, polyester resins, polyurethane resins, polycarbonate resins and polyether resins. Of these polymers, from the viewpoint of facilitating production of compounds having the aimed thermal characteristic, preferred are those polymers produced from polymerizable monomers having a carbon-carbon double bond, such as acrylic resins, styrene resins and vinyl resins. In addition, since these resins undergo thermal deformation when subjected to high-temperature treatment, it is possible to prevent falling-off of the particles from the film, and further exhibit not only functions as the particles, but also other performances such as enhancement of adhesion to various surface functional layers laminated thereon, etc.

Examples of the above polymerizable monomer having a carbon-carbon double bond include various carboxyl group-containing monomers such as acrylic acid, methacrylic acid, crotonic acid, itaconic acid, fumaric acid, maleic acid and citraconic acid, and salts thereof; various hydroxyl group-containing monomers such as 2-hydroxyethyl (meth)acrylate, 2-hydroxypropyl (meth)acrylate, 4-hydroxybutyl (meth)acrylate, monobutylhydroxyl fumarate and monobutylhydroxyl itaconate; various (meth)acrylic acid esters such as methyl (meth)acrylate, ethyl (meth)acrylate, propyl (meth)acrylate, butyl (meth)acrylate and lauryl (meth)acrylate; various nitrogen-containing compounds such as (meth)acrylamide, diacetone acrylamide, N-methylol acrylamide and (meth)acrylonitrile; various styrene derivatives such as styrene, α-methyl styrene, divinyl benzene and vinyl toluene; various vinyl esters such as vinyl propionate; various silicon-containing polymerizable monomers such as γ-methacryloxypropyl trimethoxysilane and vinyl trimethoxysilane; various phosphorus-containing vinyl-based monomers; various halogenated vinyl-based monomers such as vinyl fluoride, vinyl chloride and vinylidene chloride; and various conjugated dienes such as butadiene.

Of these polymers, acrylic resins obtained by polymerizing a (meth)acrylic polymerizable monomer as a main component are optimum. In addition, styrene/acrylic resins obtained by copolymerizing the (meth)acrylic polymerizable monomer as a main component with a styrene derivative may also be suitably used.

That is, in the present invention, as the most preferred configuration of the non-heat-resistant particles supported on at least one surface of the unstretched polyester film, there are mentioned the above non-heat-resistant non-crosslinked acrylic resin particles and non-heat-resistant non-crosslinked styrene/acrylic resin particles.

When using the non-heat-resistant non-crosslinked acrylic resin particles, the glass transition point of the resin particles is preferably in the range of 0 to 150° C., and more preferably 50 to 120° C. When the glass transition point of the non-heat-resistant non-crosslinked acrylic resin particles is lower than 0° C., there tends to occur such a fear that the resulting film fails to exhibit a sufficient slipping property. When the glass transition point of the non-heat-resistant non-crosslinked acrylic resin particles is higher than 150° C., the particles tend to be insufficient in thermal deformation.

The average particle diameter of the non-heat-resistant particles may vary depending upon a thickness of the resulting film and therefore is not particularly limited, and is preferably in the range of 0.01 to 3 μm, more preferably 0.03 to 1 μm, and still more preferably 0.05 to 0.5 μm. When the average particle diameter of the non-heat-resistant particles is less than 0.01 μm, the resulting film tends to fail to exhibit a sufficient slipping property. On the other hand, when the average particle diameter of the non-heat-resistant particles is more than 3 μm, the particles tend to fail to exhibit a sufficient deformation, so that the resulting film tends to exhibit a whitish appearance.

In the present invention, when supporting the non-heat-resistant particles on the film, various polymers or adhesive compounds are preferably used in combination with the particles for the purpose of well holding the particles on the film, etc. In particular, when supporting the non-heat-resistant particles by the coating method, the polymers are preferably used in combination with the particles for the purposes of improving a coating film appearance and a transparency and further enhancing adhesion to various layers to be provided on the resulting coating layer, etc.

Specific examples of the various polymers include polyester resins, acrylic resins, urethane resins, polyvinyl resins (such as polyvinyl alcohol), polyalkylene glycols, polyalkylene imines, methyl cellulose, hydroxy cellulose, starches, etc. Among these polymers, in view of well holding the particles and improving an adhesion property of the resulting coating layer, preferred are polyester resins, acrylic resins and urethane resins. In addition, in view of a good compatibility with the polyester film, most preferred are polyester resins.

The polyester resins may be those polyester resins produced, for example, from the following polycarboxylic acids and polyhydroxy compounds as main constituents. More specifically, as the polycarboxylic acids, there may be used terephthalic acid, isophthalic acid, orthophthalic acid, phthalic acid, 4,4'-diphenyldicarboxylic acid, 2,5-naphthalenedicarboxylic acid, 1,5-naphthalenedicarboxylic acid, 2,6-naphthalenedicarboxylic acid, 2,7-naphthalenedicarboxylic acid, 1,4-cyclohexanedicarboxylic acid, 2-potassium sulfo-terephthalic acid, 5-sodium sulfoisophthalic acid, adipic acid, azelaic acid, sebacic acid, dodecanedicarboxylic acid, glutaric acid, succinic acid, trimellitic acid, trimesic acid, pyromellitic acid, trimellitic anhydride, phthalic anhydride, p-hydroxybenzoic acid, trimellitic acid monopotassium salt and ester-forming derivatives thereof. Examples of the polyhydroxy compounds include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexane dimethanol, p-xylylene glycol, an adduct of bisphenol A and ethylene glycol, diethylene glycol, triethylene glycol, polyethylene glycol, polypropylene glycol, polytetramethylene glycol, polytetramethyleneoxide glycol, dimethylol propionic acid, glycerin, trimethylol propane, sodium dimethylol ethyl sulfonate and potassium dimethylol propionate. The polyester resins may be synthesized by subjecting one or more compounds appropriately selected from the aforementioned compounds to polycondensation reaction by an ordinary method.

The acrylic resin used in the present invention is in the form of a polymer obtained from a polymerizable monomer having a carbon-carbon double bond such as, typically, an acrylic monomer and a methacrylic monomer. The polymer may be either a homopolymer or a copolymer. The polymer may also include a copolymer of the polymer with the other polymer (such as, for example, a polyester and a polyurethane). Examples of the copolymer include a block copolymer and a graft copolymer. In addition, the polymer may also include a polymer obtained by polymerizing the polymerizable monomer having a carbon-carbon double bond in a polyester solution or a polyester dispersion (which may also be in the form of a mixture of the polymers). Further, the polymer may also include a polymer obtained by polymerizing the polymerizable monomer having a carbon-carbon double bond in a polyurethane solution or a polyurethane dispersion (which may also be in the form of a mixture of the polymers). Similarly, the polymer may also include a polymer obtained by polymerizing the polymerizable monomer having a carbon-carbon double bond in the other polymer solution or the other polymer dispersion (which may also be in the form of a mixture of the polymers). In addition, in the case where it is required to further enhance an adhesion property of the coating layer, a hydroxyl group or an amino group may be incorporated thereinto.

The above polymerizable monomer having a carbon-carbon double bond is not particularly limited. Examples of the typical compounds as the polymerizable monomer include various carboxyl group-containing monomers such as acrylic acid, methacrylic acid, crotonic acid, itaconic acid, fumaric acid, maleic acid and citraconic acid, and salts thereof; various hydroxyl group-containing monomers such as 2-hydroxyethyl (meth)acrylate, 2-hydroxypropyl (meth) acrylate, 4-hydroxybutyl (meth)acrylate, monobutylhydroxyl fumarate and monobutylhydroxyl itaconate; various (meth)acrylic acid esters such as methyl (meth)acrylate, ethyl (meth)acrylate, propyl (meth)acrylate, butyl (meth) acrylate and lauryl (meth)acrylate; various nitrogen-containing compounds such as (meth)acrylamide, diacetone acrylamide, N-methylol acrylamide and (meth)acrylonitrile; various styrene derivatives such as styrene, α-methyl styrene, divinyl benzene and vinyl toluene; various vinyl esters such as vinyl propionate; various silicon-containing polymerizable monomers such as γ-methacryloxypropyl trimethoxysilane and vinyl trimethoxysilane; various phosphorus-containing vinyl-based monomers; various halogenated vinyl-based monomers such as vinyl chloride and vinylidene chloride; and various conjugated dienes such as butadiene.

The urethane resin used in the present invention is a high-molecular compound having a urethane bond in a molecule thereof. The urethane resin is usually produced by the reaction between a polyol and an isocyanate. Examples of the polyol include polycarbonate polyols, polyester polyols, polyether polyols, polyolefin polyols and acrylic polyols. These compounds may be used alone or in combination of any two or more thereof.

The polycarbonate polyols may be obtained by subjecting a polyhydric alcohol and a carbonate compound to dealcoholization reaction. Examples of the polyhydric alcohol include ethylene glycol, 1,2-propylene glycol, 1,3-propylene glycol, 1,2-butanediol, 1,3-butanediol, 1,4-butanediol, 1,5-pentanediol, 1,6-hexanediol, 1,4-cyclohexanediol, 1,4-cyclohexane dimethanol, 1,7-heptanediol, 1,8-octanediol, 1,9-nonanediol, 1,10-decanediol, neopentyl glycol, 3-methyl-1,5-pentanediol and 3,3-dimethylol heptane. Examples of the carbonate compound include dimethyl carbonate, diethyl carbonate, diphenyl carbonate and ethylene carbonate. Examples of the polycarbonate polyols obtained by the reaction between the above compounds include poly(1,6-hexylene)carbonate and poly(3-methyl-1,5-pentylene)carbonate.

Examples of the polyester polyols include those produced by reacting a polycarboxylic acid (such as malonic acid, succinic acid, glutaric acid, adipic acid, pimelic acid, suberic acid, sebacic acid, fumaric acid, maleic acid, terephthalic acid and isophthalic acid) or an acid anhydride thereof with a polyhydric alcohol (such as ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethylcyclohexane, dimethanol benzene, bishydroxyethoxybenzene, alkyl dialkanol amines and lactonediol).

Examples of the polyether polyols include polyethylene glycol, polypropylene glycol, polyethylene/propylene glycol, polytetramethylene ether glycol and polyhexamethylene ether glycol.

Among the above polyols, in order to enhance an adhesive property of the coating layer to various topcoat layers, the polycarbonate polyols and the polyester polyols are preferably used.

Examples of a polyisocyanate compound used for producing the urethane resin include aromatic diisocyanates such as tolylene diisocyanate, xylylene diisocyanate, methylene diphenyl diisocyanate, phenylene diisocyanate, naphthalene diisocyanate and tolidine diisocyanate; aromatic ring-containing aliphatic diisocyanates such as α,α,α',α'-tetramethyl xylylene diisocyanate; aliphatic diisocyanates such as methylene diisocyanate, propylene diisocyanate, lysine diisocyanate, trimethyl hexamethylene diisocyanate and hexamethylene diisocyanate; and alicyclic diisocyanates such as cyclohexane diisocyanate, methyl cyclohexane diisocyanate, isophorone diisocyanate, dicyclohexylmethane diisocyanate and isopropylidene dicyclohexyl diisocyanate. These polyisocyanate compounds may be used alone or in combination of any two or more thereof.

When the urethane resin is synthesized, there may be used a chain extender. The chain extender is not particularly limited, and any chain extender may be used as long as it has two or more active groups capable of reacting with an isocyanate group. In general, there may be mainly used such a chain extender having two hydroxyl groups or two amino groups.

Examples of the chain extender having two hydroxyl groups include glycols, e.g., aliphatic glycols such as ethylene glycol, propylene glycol and butanediol; aromatic glycols such as xylylene glycol and bishydroxyethoxybenzene; and ester glycols such as neopentyl glycol hydroxypivalate. Examples of the chain extender having two amino groups include aromatic diamines such as tolylenediamine, xylylenediamine and diphenylmethanediamine; aliphatic diamines such as ethylenediamine, propylenediamine, hexanediamine, 2,2-dimethyl-1,3-propanediamine, 2-methyl-1,5-pentanediamine, trimethyl hexanediamine, 2-butyl-2-ethyl-1,5-pentanediamine, 1,8-octanediamine, 1,9-nonanediamine and 1,10-decanediamine; and alicyclic diamines such as 1-amino-3-aminomethyl-3,5,5-trimethyl cyclohexane, dicyclohexylmethanediamine, isopropylidene cyclohexyl-4,4'-diamine, 1,4-diaminocyclohexane and 1,3-bisaminomethyl cyclohexane.

The urethane resin used in the present invention may be dispersed or dissolved in a solvent as a medium, and is preferably dispersed or dissolved in water as the medium. In order to disperse or dissolve the urethane resin in water, there may be used those urethane resins of a forcibly emulsifiable type which can be dispersed and dissolved using an emulsifier, or those urethane resins of a self-emulsifiable type or a water-soluble type which are obtained by introducing a hydrophilic group into urethane resins, etc. Among these urethane resins, in particular, self-emulsifiable type urethane resins which are ionomerized by introducing an ionic group into a skeleton of urethane resins are preferred because they are excellent in storage stability of the coating solution as well as water resistance, transparency and adhesion property of the resulting coating layer. Examples of the ionic group to be introduced into the urethane resins include various groups such as a carboxyl group, a sulfonic acid group, a phosphoric acid group, a phosphonic acid group and a quaternary ammonium salt group. Among these ionic groups, preferred is a carboxyl group. As the method of introducing a carboxyl group into the urethane resin, there may be used various methods which may be carried out in respective stages of the polymerization reaction. For example, there may be used the method in which a carboxyl group-containing resin is used as a comonomer component upon synthesis of a prepolymer, or the method in which a carboxyl group-containing component is used as one component of the polyol, the polyisocyanate, the chain extender and the like. In particular, there is preferably used the method in which a carboxyl group-containing diol is used to introduce a desired amount of a carboxyl group into the urethane resins by suitably adjusting an amount of the diol component charged. For example, the diol used in the polymerization for production of the urethane resin may be copolymerized with dimethylol propionic acid, dimethylol butanoic acid, bis-(2-hydroxyethyl) propionic acid, bis-(2-hydroxyethyl)butanoic acid, etc. In addition, the carboxyl group thus introduced is preferably formed into a salt thereof by neutralizing the carboxyl group with ammonia, amines, alkali metals, inorganic alkalis, etc. Among these compounds used for the neutralization, especially preferred are ammonia, trimethylamine and triethylamine. When using such a polyurethane resin, the carboxyl group thereof from which the neutralizing agent is removed in the drying step after the coating step may be used as a crosslinking reaction site which can be reacted with other crosslinking agents. As a result, the coating solution using the above-described urethane resin is excellent in stability even when preserved in the form of a solution before subjected to coating treatment, and further the coating layer obtained therefrom can be further improved in durability, solvent resistance, water resistance, anti-blocking property, etc.

In addition, in the present invention, for the purpose of enhancing a strength of the resulting coating layer upon supporting the non-heat-resistant particles on the film, a crosslinking agent may be used in combination with the above polymers, etc. As the crosslinking agent used in combination with the polymers, etc., there may be used various known crosslinking agents. Examples of the crosslinking agent include an oxazoline compound, an epoxy compound, a melamine compound, an isocyanate compound, a carbodiimide compound and a silane coupling compound, etc.

Examples of the oxazoline compounds include those compounds having an oxazoline group in a molecule thereof. Especially preferred are polymers having an oxazoline group which may be in the form of a homopolymer of an addition-polymerizable oxazoline group-containing monomer or a copolymer of the addition-polymerizable oxazoline group-containing monomer with the other monomer. Examples of the addition-polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline. These oxazoline compounds may be used alone or in the form of a mixture of any two or more thereof. Among these oxazoline compounds, 2-isopropenyl-2-oxazoline is more preferred because of industrial availability thereof. The other monomers used in the copolymer are not particularly limited as long as they are monomers that are copolymerizable with the addition-polymerizable oxazoline group-containing monomer. Examples of the other monomers include (meth) acrylic acid esters such as alkyl (meth)acrylates (in which the alkyl group may be methyl, ethyl, n-propyl, isopropyl, n-butyl, isobutyl, t-butyl, 2-ethylhexyl, cyclohexyl or the like); unsaturated carboxylic acids such as acrylic acid, methacrylic acid, itaconic acid, maleic acid, fumaric acid, crotonic acid, styrenesulfonic acid and salts thereof (such as sodium salts, potassium salts, ammonium salts and tertiary amine salts); unsaturated nitriles such as acrylonitrile and methacrylonitrile; unsaturated amides such as (meth)acrylamide, N-alkyl (meth)acrylamides and N,N-dialkyl (meth) acrylamides (in which the alkyl group may be methyl, ethyl, n-propyl, isopropyl, n-butyl, isobutyl, t-butyl, 2-ethylhexyl, cyclohexyl or the like); vinyl esters such as vinyl acetate and vinyl propionate; vinyl ethers such as methyl vinyl ether and ethyl vinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methyl styrene. These other monomers may be used alone or in combination of any two or more thereof.

The epoxy compound is a compound having an epoxy group in a molecule thereof. Examples of the epoxy compound include condensation products of epichlorohydrin with a hydroxyl group of ethylene glycol, polyethylene glycol, glycerol, polyglycerol, bisphenol A, etc., or an amino group. Specific examples of the epoxy compound include polyepoxy compounds, diepoxy compounds, monoepoxy compounds and glycidyl amine compounds. Examples of the polyepoxy compounds include sorbitol polyglycidyl ether, polyglycerol polyglycidyl ether, pentaerythritol polyglycidyl ether, diglycerol polyglycidyl ether, triglycidyl tris(2-hydroxyethyl)isocyanate, glycerol polyglycidyl ether and trimethylolpropane polyglycidyl ether. Examples of the diepoxy compounds include neopentyl glycol diglycidyl ether, 1,6-hexanediol diglycidyl ether, resorcin diglycidyl ether, ethylene glycol diglycidyl ether, polyethylene glycol diglycidyl ether, propylene glycol diglycidyl ether, polypropylene glycol diglycidyl ether and polytetramethylene glycol diglycidyl ether. Examples of the monoepoxy compounds include allyl glycidyl ether, 2-ethylhexyl glycidyl ether and phenyl glycidyl ether. Examples of the glycidyl amine compounds include N,N,N',N'-tetraglycidyl-m-xylylenediamine and 1,3-bis(N,N-diglycidylamino)cyclohexane.

The melamine compound is a compound having a melamine skeleton therein. Examples of the melamine compound include alkylolated melamine derivatives, partially or completely etherified compounds obtained by reacting the alkylolated melamine derivative with an alcohol, and a mixture of these compounds. Examples of the alcohol suitably used for the above etherification include methyl alcohol, ethyl alcohol, isopropyl alcohol, n-butanol and isobutanol. The melamine compound may be either a monomer or a dimer or higher polymer, or may be in the form of a mixture thereof. In addition, there may also be used those compounds obtained by subjecting a urea or the like to co-condensation with a part of melamine. Further, a catalyst may also be used to enhance a reactivity of the melamine compound.

The isocyanate-based compound is a compound having an isocyanate derivative structure such as typically an isocyanate and a blocked isocyanate. Examples of the isocyanate include aromatic isocyanates such as tolylene diisocyanate, xylylene diisocyanate, methylene diphenyl diisocyanate, phenylene diisocyanate and naphthalene diisocyanate; aromatic ring-containing aliphatic isocyanates such as α,α,α',α'-tetramethyl xylylene diisocyanate; aliphatic isocyanates such as methylene diisocyanate, propylene diisocyanate, lysine diisocyanate, trimethyl hexamethylene diisocyanate and hexamethylene diisocyanate; and alicyclic isocyanates such as cyclohexane diisocyanate, methyl cyclohexane diisocyanate, isophorone diisocyanate, methylene-bis(4-cyclohexyl isocyanate) and isopropylidene dicyclohexyl diisocyanate. Further examples of the isocyanate include polymers and derivatives of these isocyanates such as biuret compounds, isocyanurate compounds, uretdione compounds and carbodiimide-modified compounds thereof. These isocyanates may be used alone or in combination of any two or more thereof. Of these isocyanates, in view of avoiding yellowing due to irradiation with ultraviolet rays, aliphatic isocyanates and alicyclic isocyanates are more suitably used as compared to aromatic isocyanates.

When the isocyanate-based compound is used in the form of a blocked isocyanate, examples of blocking agents used for production thereof include bisulfites; phenol-based compounds such as phenol, cresol and ethyl phenol; alcohol-based compounds such as propylene glycol monomethyl ether, ethylene glycol, benzyl alcohol, methanol and ethanol; active methylene-based compounds such as dimethyl malonate, diethyl malonate, methyl acetoacetate, ethyl acetoacetate and acetyl acetone; mercaptan-based compounds such as butyl mercaptan and dodecyl mercaptan; lactam-based compounds such as ε-caprolactam and δ-valerolactam; amine-based compounds such as diphenyl aniline, aniline and ethylene imine; acid amide-based compounds such as acetanilide and acetic acid amide; and oxime-based compounds such as formaldehyde, acetaldoxime, acetone oxime, methyl ethyl ketone oxime and cyclohexanone oxime. These blocking agents may be used alone or in combination of any two or more thereof.

In addition, in the present invention, the isocyanate-based compounds may be used in the form of a single substance or in the form of a mixture with various polymers or a bonded product therewith. The isocyanate-based compounds are preferably used in the form of a mixture or a bonded product with polyester resins or urethane resins from the standpoint of improving a dispersibility or a crosslinking reactivity of the isocyanate-based compounds.

The carbodiimide-based compound is a compound having a carbodiimide structure. The carbodiimide-based compound may be used for enhancing an adhesion property of the coating layer to a surface functional layer such as a hard coat layer which may be formed on the coating layer, etc., as well as a wet heat resistance of the coating layer. The carbodiimide-based compound is in the form of a compound having one or more carbodiimide structures or carbodiimide derivative structures in a molecule thereof, and the preferred carbodiimide-based compound is a polycarbodiimide-based compound having two or more carbodiimide structures or carbodiimide derivative structures in a molecule thereof in view of a good adhesion property or the like of the resulting coating layer.

The carbodiimide-based compound may be synthesized by conventionally known techniques. In general, the carbodiimide-based compound may be obtained by a condensation reaction of a diisocyanate compound. The diisocyanate compound is not particularly limited, and may be either an aromatic diisocyanate or an aliphatic diisocyanate. Specific examples of the diisocyanate compound include tolylene diisocyanate, xylene diisocyanate, diphenylmethane diisocyanate, phenylene diisocyanate, naphthalene diisocyanate, hexamethylene diisocyanate, trimethyl hexamethylene diisocyanate, cyclohexane diisocyanate, methyl cyclohexane diisocyanate, isophorone diisocyanate, dicyclohexyl diisocyanate and dicyclohexylmethane diisocyanate.

Further, in order to improve a water solubility or a water dispersibility of the polycarbodiimide-based compound, a surfactant or a hydrophilic monomer such as a polyalkyleneoxide, a quaternary ammonium salt of a dialkylamino alcohol and a hydroxyalkyl sulfonic acid salt may be added thereto unless the addition thereof eliminates the effects of the present invention.

Meanwhile, these crosslinking agents are used for improving a performance of the coating layer by allowing the crosslinking agents to react with the compounds contained therein during a drying step or a film-forming step thereof. Therefore, it is estimated that the resulting coating layer comprises the unreacted crosslinking agent, compounds obtained after the reaction, or a mixture thereof.

The analysis of the components contained in the final configuration of the non-heat-resistant particles may be conducted, for example, by analysis methods such as TOF-SIMS, ESCA and various surface and section observation methods.

When supporting the non-heat-resistant particles on the film by the coating method, the polyester film is preferably produced by the method in which a solution or a solvent dispersion comprising a series of the above-mentioned compounds is prepared as a coating solution having a concentration of about 0.1 to about 80% by weight in terms of a solid content thereof, and the thus prepared coating solution is applied onto the polyester film. In particular, in view of an in-line coating method, an aqueous solution or a water dispersion is preferably used. The coating solution may also comprise a small amount of an organic solvent for the purpose of improving a dispersibility in water, a film-forming property, etc. The organic solvents may be used alone, or may be appropriately used in the form of a mixture of any two or more thereof.

The amount of the non-heat-resistant particles supported on the film as the constituent of the polyester film according to the present invention is not particularly limited as long as the aimed object of the present invention can be achieved. Also, the amount of the non-heat-resistant particles supported on the film may vary depending upon thermal characteristic and size of the particles and film-forming conditions such as stretching ratios and therefore is not particularly limited, and the amount of the non-heat-resistant particles supported on only one surface of the film as measured with respect to the dried film (before stretching) is preferably in the range of 0.01 to 200 mg/m$^2$, more preferably 0.1 to 150 mg/m$^2$, and still more preferably 1 to 70 mg/m$^2$.

In the case where the non-heat-resistant particles are supported on the film by the coating method, the film thickness of the dried coating layer (before stretching) may also vary depending upon size of the particles and stretching ratios, etc., and therefore is not particularly limited, and is usually in the range of 0.001 to 5 μm, preferably 0.01 to 3 μm, and more preferably 0.1 to 1 μm. When the film thickness of the coating layer is out of the above-specified range, the resulting film tends to suffer from blocking or tends to be deteriorated in appearance of the coating layer.

In the present invention, as the method of supporting the non-heat-resistant particles on the film by the coating method, there may be used conventionally known coating methods, for example, such as a reverse gravure coating method, a direct gravure coating method, a roll coating method, a die coating method, a bar coating method, a curtain coating method and a spray coating method.

Further, when supporting the non-heat-resistant particles on the film, the film may be subjected to surface treatments such as corona treatment and plasma treatment, if required.

In addition, in the present invention, the above unstretched polyester film not only may support the non-heat-resistant particles, bur also may be provided thereon with a coating layer for imparting various performances to the polyester film. The coating layer may be provided on a surface of the polyester film on which the non-heat-resistant particles are supported or on an opposite surface thereof. Also, the coating may be provided on one or both surfaces of the polyester film. The coating layer may be formed either by an in-line coating method in which the surface of the polyester film is subjected to coating treatment during the film-forming step of the polyester film, or by an off-line coating method in which the polyester film produced is once transferred to an outside of the film production system and subjected to coating treatment. Among these methods, the in-line coating method is preferably used because the coating layer can be produced simultaneously with formation of the polyester film and therefore at low costs.

For example, in the case of a sequential biaxial stretching process, the in-line coating treatment may be carried out, in particular, after completion of the longitudinal stretching but before initiation of the lateral stretching, although the present invention is not particularly limited thereto. When the coating layer is formed on the polyester film by the in-line coating method, the coating can be carried out simultaneously with formation of the polyester film, and the coating layer can be treated at a high temperature when subjecting the stretched polyester film to the heat-setting step, so that the resulting coated film can be enhanced in performance such as an adhesion property to various surface functional layers to be formed on the coating layer as well as a wet heat resistance of the resulting film, etc. Also, when the coating step is conducted before stretching the polyester film, the thickness of the coating layer may be changed by adjusting a stretching ratio of the film, so that the thin-film coating step can be more easily conducted as compared to the off-line coating method. Thus, by using the in-line coating method, in particular, by conducting the in-line coating method before the stretching, it is possible to produce a film suitable as the polyester film used in the present invention.

That is, as one of the preferred production processes according to the present invention, there may be mentioned, for example, the method in which the unstretched film is formed after melt-extrusion, and then after the non-heat-resistant particles are supported on the film by a coating method, the film is subjected to longitudinal stretching step, and further a coating step is conducted to form the coating layer thereon, and thereafter the film is subjected to lateral stretching step and then to high-temperature treatment.

The coating layer provided for not only supporting the non-heat-resistant particles on the unstretched polyester film but also imparting various performances thereto may also be used for the purpose of enhancing adhesion to various surface functional layers such as, for example, a hard coat layer, a prism layer, a micro-lens layer, a light diffusion layer, an anti-reflection layer, an ink layer and an adhesive layer, etc.

The coating layer provided for imparting various performances to the stretched polyester film may also comprise various polymers or crosslinking agents. Specific examples of these compounds are the same as those compounds that are used in combination with the non-heat-resistant particles as described above.

In recent years, in the applications of members for touch panels or members for molding, a clear hard coat layer has been frequently provided on the polyester film among the above various surface functional layers. In order to enhance adhesion between the polyester film and the hard coat layer, a coating layer having an easy-bonding property is generally provided as an intermediate layer therebetween. For this reason, refractive indices of these three layers including the polyester film, the easy-bonding coating layer and the hard coat layer must be taken into consideration to avoid occurrence of interference fringes.

When using the films exhibiting interference fringes in displays such as touch panels or molding members requiring a good design property such as a housing for mobile phones, the displays or molding members tend to exhibit a poor visibility, resulting in poor handling property thereof upon use. For this reason, it has been required to take a suitable measure against occurrence of the interference fringes. In general, it is considered that in order to suppress occurrence of interference fringes, the refractive index of the coating layer is controlled near to a geometrical mean value of a refractive index of the polyester film as the base material and a refractive index of the hard coat layer. Therefore, it is ideally required to adjust the refractive index of the coating layer near to the geometrical mean value. In this case, since the polyester film has a high refractive index, it has been generally required that the coating layer is designed to have a high refractive index.

In the case where the polyester film is used in the above applications, it is required that the coating layer formed thereon is designed to have a high refractive index. For this reason, it is required to use a high-refractive index material for forming the coating layer. As the high-refractive index material, there may be used conventionally known materials. Examples of the high-refractive index material include aromatic compounds having a benzene structure, a bisphenol A structure or a melamine structure, condensed polycyclic aromatic compounds having a naphthalene structure which are considered to be a still higher-refractive index material among the aromatic compounds, metal-containing compounds such as metal oxides and metal chelate compounds, sulfur element-containing compounds, and halogen element-containing compounds.

Of these high-refractive index materials, from the standpoint of maintaining good adhesion to various surface functional layers such as a hard coat layer, preferred are aromatic compounds that may be incorporated in a large amount into various compounds such as polyester resins, and in view of more effectively enhancing a refractive index of the coating layer, more preferred are condensed polycyclic aromatic compounds. In addition, from the standpoint of enhancing a refractive index of the coating layer while increasing a strength thereof, melamine compounds are suitably used. Furthermore, in order to more effectively enhance a refractive index of the coating layer than the aromatic compounds, the metal-containing compounds such as metal oxides and metal chelate compounds are also preferably used.

In view of a good coatability on the polyester film, the compound having an aromatic structure is preferably in the form of a polymer compound, for example, such as a polyester resin, an acrylic resin or a urethane resin. Among these resins, the polyester resin is more preferred because a larger number of the aromatic structures can be introduced into the polyester resin to thereby enhance a refractive index of the coating layer.

Examples of the condensed polycyclic aromatic compounds having a higher refractive index among the aromatic compounds include naphthalene, anthracene, phenanthrene, naphthacene, benzo[a]anthracene, benzo[a]phenanthrene, pyrene, benzo[c]phenanthrene and perylene.

As the method of incorporating the condensed polycyclic aromatic structure into the polyester resin, there may be used, for example, the method of introducing two or more hydroxyl groups as substituent groups into the condensed polycyclic aromatic structure to provide a diol component or a polyhydroxyl group component, or the method of introducing two or more carboxyl groups as substituent groups into the condensed polycyclic aromatic structure to provide a dicarboxylic acid component or a polycarboxylic acid component.

From the standpoint of hardly suffering from undesirable coloration during the process for producing the laminated polyester film, compounds having a naphthalene skeleton are preferably used as the compound having a condensed polycyclic aromatic structure used for forming the coating layer. Also, in view of a good adhesion property of the coating layer to various surface functional layers formed on the coating layer and a good transparency of the resulting film, those resins into which the naphthalene skeleton is incorporated as a constituent of the polyester can be suitably used. Typical examples of the naphthalene skeleton include 1,5-naphthalenedicarboxylic acid, 2,6-naphthalenedicarboxylic acid and 2,7-naphthalenedicarboxylic acid.

Meanwhile, not only the above hydroxyl group or carboxyl group, but also a substituent group comprising a sulfur element, an aromatic substituent group such as a phenyl group, a halogen element group or the like may be introduced into the condensed polycyclic aromatic structure, whereby it is expected to enhance a refractive index of the resulting coating layer. From the viewpoint of a good coatability and a good adhesion property, the substituent group such as an alkyl group, an ester group, an amide group, a sulfonic group, a carboxyl group and a hydroxyl group may be introduced into the condensed polycyclic aromatic structure.

Specific examples of the metal-containing compounds that are expected to provide a material capable of more effectively enhancing a refractive index of the coating layer include metal oxides such as titanium oxide, zinc oxide, tin oxide, antimony oxide, yttrium oxide, zirconium oxide, indium oxide, cerium oxide, ATO (antimony tin oxide) and ITO (indium tin oxide), and metal element-containing organic compounds, e.g., aluminum compounds such as aluminum acetyl acetonate, hydroxy aluminum diacetate and dihydroxy aluminum acetate; titanium compounds such as tetra-n-butyl titanate, tetra-isopropyl titanate, a butyl titanate dimer, tetra(2-ethylhexyl)titanate, tetramethyl titanate, titanium acetyl acetonate, titanium tetraacetyl acetonate, poly(titanium acetyl acetonate), titanium octylene glycolate, titanium lactate, titanium triethanol aminate and titanium ethyl acetoacetate; iron compounds such as iron acetyl acetonate and iron acetate; cobalt compounds such as cobalt acetyl acetonate; copper compounds such as copper acetate, copper acetate monohydrate, copper acetate multi-hydrate and copper acetyl acetonate; zinc compounds such as zinc acetate, zinc acetate dihydrate and zinc acetyl acetonate hydrate; and zirconium compounds such as zirconium acetate, zirconium n-propylate, zirconium n-butyrate, zirconium tetraacetyl acetonate, zirconium monoacetyl acetonate and zirconium bis(acetyl acetonate). These metal-containing compounds may be used alone or in combination of any two or more thereof.

Among the above metal compounds, from the viewpoints of a good coating appearance and a good transparency, especially preferred are the metal chelate compounds. In view of application to the in-line coating method, etc., more preferred are water-soluble titanium chelate compounds, water-soluble zirconium chelate compounds and the like. From the standpoint of a good stability of the coating solution used in the form of an aqueous form, still more preferred are titanium triethanol aminate and titanium lactate.

In view of a good stability of the coating solution and a coating appearance of the resulting coating layer, two or more kinds of metal chelate compounds are preferably used, in particular, two or more kinds of titanium chelate compounds are more preferably used. That is, when the metal chelate compound is used for forming the second coating layer, the optimum configuration thereof is a combined use of titanium triethanol aminate and titanium lactate.

In order to further enhance adhesion to the coating layer to the surface functional layer such as a hard coat layer, two or more kinds of crosslinking agents may be suitably used in combination with the above metal compounds for forming the coating layer. In this case, there can be proposed such a design that in order to compensate deterioration in refractive index of the coating layer owing to the use of the two or more kinds of crosslinking agents, the metal oxide having higher refractive index is used in combination therewith, that is, there can be proposed such a coating layer as prepared from a coating solution comprising the metal oxide and the two or more kinds of crosslinking agents.

The metal oxide is used mainly for the purpose of controlling a refractive index of the coating layer. In particular, since the resin used in the coating layer has a low refractive index, the use of the metal oxide having a high refractive index is preferred, and the use of the metal oxide having a refractive index of not less than 1.7 is more preferred. Specific examples of the metal oxide include zirconium oxide, titanium oxide, tin oxide, yttrium oxide, antimony oxide, indium oxide, zinc oxide, antimony tin oxide and indium tin oxide. These metal oxides may be used alone or in combination of any two or more thereof. Among these metal oxides, preferred are zirconium oxide and titanium oxide. In particular, zirconium oxide is more preferred from the standpoint of imparting a good weather resistance to the coating layer.

The metal oxide tends to have a fear of causing deterioration in adhesion property of the coating layer depending upon its configuration upon use. Therefore, the metal oxide is preferably used in the form of particles. In addition, from the standpoint of a good transparency of the coating layer, the average particle diameter of the metal oxide is preferably not more than 100 nm, more preferably not more than 50 nm, and still more preferably not more than 25 nm.

With respect to the crosslinking agents used for enhancing an adhesion property of the coating layer, it has been found that even by incorporating only one kind of crosslinking agent in the coating layer, it was possible to enhance an adhesion property of the coating layer. In addition, it has been found that by using combination of two or more kinds of crosslinking agents, the resulting coating layer is further improved in adhesion property, in particular, improved in adhesion property after subjected to a wet heat test.

Examples of the crosslinking agents include an oxazoline compound, an epoxy compound, a melamine compound, an isocyanate-based compound, a carbodiimide-based compound and a silane coupling compound. Among these crosslinking agents, in view of a good adhesion property of the coating layer, especially preferred are an oxazoline compound and an epoxy compound, and more preferred is a combined use of an oxazoline compound and an epoxy compound. As these crosslinking agents, there may be used various crosslinking agents used upon supporting the non-heat-resistant particles on the film.

Also, for the purpose of improving an anti-blocking property and a slipping property of the resulting film, particles other than the above metal oxide may be used in the coating layer in combination therewith. The average particle diameter of the other particles is preferably in the range of not more than 1.0 μm, more preferably 0.01 to 0.5 μm, and still more preferably 0.03 to 0.2 μm from the viewpoint of a good transparency of the resulting film. Specific examples of the particles used in the coating layer include silica, alumina, kaolin, calcium carbonate, heat-resistant organic particles or the like. Of these particles, preferred are silica particles.

Further, upon forming the coating layer, there may also be used various additives such as a defoaming agent, a coatability improver, a thickening agent, an organic lubricant, an antistatic agent, an ultraviolet absorber, an antioxidant, a foaming agent, a dye and a pigment, if required, unless the subject matter of the present invention is adversely affected by addition thereof to the coating layer.

As described above, the coating layer can be produced from the coating solution comprising the metal oxide and the two or more kinds of crosslinking agents which can be used in the applications in which enhancement of adhesion to various surface functional layers such as a hard coat layer as well as suppression of occurrence of interference fringes owing to reflection of external light are required. In the following, the proportions of the respective components of the coating layer are explained.

In the case where the coating layer is produced from the coating solution comprising the metal oxide and the two or more kinds of crosslinking agents, the content of the metal oxide in the coating solution forming the coating layer is usually 3 to 70% by weight, preferably 5 to 50% by weight, more preferably 5 to 40% by weight and still more preferably 8 to 30% by weight based on a total amount of whole non-volatile components in the coating solution. When the content of the metal oxide in the coating solution is less than 3% by weight, the obtained coating layer may fail to exhibit a sufficiently high refractive index, so that the resulting film tends to be hardly improved in suppression of occurrence of interference fringes. When the content of the metal oxide in the coating solution is more than 70% by weight, the obtained coating layer tends to be deteriorated in transparency.

In the case where the coating layer is produced from the coating solution comprising the metal oxide and the two or more kinds of crosslinking agents, the content of the two or more kinds of crosslinking agents in the coating solution forming the coating layer is usually 2 to 80% by weight, preferably 4 to 60% by weight and more preferably 10 to 40% by weight based on a total amount of whole non-volatile components in the coating solution. When the content of the crosslinking agents in the coating solution is out of the above-specified range, there tends to occur such a fear that the resulting coating layer is deteriorated in adhesion property to a surface functional layer such as a hard coat layer, the coating layer tends to be deteriorated in appearance, or the resulting film tends to be deteriorated in visibility owing to occurrence of interference fringes after forming the surface functional layer such as a hard coat layer thereon.

In the case where the coating layer is produced from the coating solution comprising the metal oxide and the two or more kinds of crosslinking agents and in the case where an oxazoline compound is used as the crosslinking agent, the content of the oxazoline compound in the coating solution forming the coating layer is usually 1 to 50% by weight, preferably 1 to 30% by weight and more preferably 3 to 20% by weight based on a total amount of whole non-volatile components in the coating solution. When the content of the oxazoline compound in the coating solution is less than 1% by weight, there tends to occur such a fear that the obtained coating layer is deteriorated in adhesion property to a surface functional layer such as a hard coat layer. When the content of the oxazoline compound in the coating solution is more than 50% by weight, the obtained coating layer tends to exhibit a low refractive index, so that the resulting film tends to be deteriorated in visibility owing to occurrence of interference fringes after forming a surface functional layer such as a hard coat layer on the coating layer.

In the case where the coating layer is produced from the coating solution comprising the metal oxide and the two or more kinds of crosslinking agents and in the case where an epoxy compound is used as the crosslinking agent, the content of the epoxy compound in the coating solution forming the coating layer is usually 1 to 50% by weight, preferably 3 to 30% by weight and more preferably 5 to 20% by weight based on a total amount of whole non-volatile components in the coating solution. When the content of the epoxy compound in the coating solution is out of the above-specified range, there tends to occur such a fear that the obtained coating layer is deteriorated in adhesion property to a surface functional layer such as a hard coat layer, or the coating layer tens to be deteriorated in coating appearance.

In the case where the coating layer is produced from the coating solution comprising the metal oxide and the two or more kinds of crosslinking agents, the content of the condensed polycyclic aromatic structure in the compound having a condensed polycyclic aromatic structure is usually 5 to 80% by weight and preferably 10 to 60% by weight. The content of the compound having a condensed polycyclic aromatic structure in the coating solution for forming the second coating layer is preferably in the range of not more than 80% by weight, more preferably 5 to 70% by weight and still more preferably 10 to 50% by weight based on a total amount of whole non-volatile components in the coating solution. When the compound having a condensed polycyclic aromatic structure is used within such a specific range, the refractive index of the coating layer can be readily adjusted, and the coating layer can be readily prevented from suffering from occurrence of interference fringes after forming a surface functional layer such as a hard coat layer on the coating layer. Meanwhile, the content of the condensed polycyclic aromatic structure in the compound having a condensed polycyclic aromatic structure may be determined as follows. That is, the coating layer is dissolved and extracted, for example, using a suitable solvent or warm water, and the obtained extract is fractionated by chromatography and then subjected to structural analysis by NMR or IR and further subjected to pyrolysis GC-MS (gas chromatography-mass spectrometry), an optical analysis or the like.

The analysis of the components contained in the coating layer may be conducted, for example, by analysis methods such as TOF-SIMS, ESCA, fluorescent X-ray and various surface and section observation methods.

When forming the coating layer by the in-line coating method, the polyester film is preferably produced by the method in which an aqueous solution or a water dispersion comprising a series of the above mentioned compounds is prepared as a coating solution having a concentration of about 0.1 to about 50% by weight in terms of a solid content thereof, and the thus prepared coating solution is applied onto the polyester film. The coating solution may also comprise a small amount of an organic solvent for the purpose of improving a dispersibility in water, a film-forming property, etc., unless the subject matter of the present invention is adversely affected thereby. The organic solvents may be used alone, or may be appropriately used in the form of a mixture of any two or more thereof.

In the polyester film according to the present invention, the thickness of the coating layer formed on the polyester film after dried and stretched is usually in the range of not more than 1 μm, preferably 0.001 to 0.5 μm, and more preferably 0.01 to 0.2 μm. When the thickness of the coating layer is out of the above-specified range, the resulting film tends to suffer from problems such as occurrence of blocking and poor coating appearance.

Even in the above case, in the applications requiring suppression of interference fringes, in particular, when forming a surface functional layer such as a hard coat layer on the coating layer, as the method of supporting the non-heat-resistant particles on the film, there is preferably used the method of applying a coating solution comprising the non-heat-resistant particles onto the film to provide the coating layer. The thickness of the coating layer (after dried and before stretched) may vary depending upon the size of the particles, stretching ratios of the film, etc., and therefore is not particularly limited, and is preferably in the range of 0.001 to 5 μm, more preferably 0.01 to 3 μm, still more preferably 0.05 to 1 μm, and most preferably 0.1 to 0.7 μm. When the thickness of the coating layer is out of the above-specified range, the resulting film tends to suffer from problems such as occurrence of blocking, poor coating appearance and falling-off of the particles. In addition, in the case where the coating layer (hereinafter also referred to as the "first coating layer") is provided thereon with another coating layer (hereinafter also referred to as the "second coating layer") to suppress occurrence of interference fringes owing to reflection of external light after forming various surface functional layers thereon, it has been found that the first coating layer gives substantially no influence on occurrence of interference fringes, and whether any influence on interference fringes occurs or not is determined by the design of the second coating layer. However, when the thickness of the first coating layer is excessively large, the influence of the first coating layer tends to be increased, so that it may be difficult to design the film capable of suppressing occurrence of interference fringes.

The film thickness of the second coating layer of the film after dried and stretched is usually in the range of 0.04 to 0.20 μm, preferably 0.05 to 0.16 μm, and more preferably 0.07 to 0.13 μm. When the film thickness of the second coating layer is out of the above-specified range, the resulting film tends to be deteriorated in visibility owing to occurrence of interference fringes after laminating a surface functional layer on the coating layer.

In the present invention, as the method of forming the coating layer, there may be used conventionally known coating methods such as a reverse gravure coating method, a direct gravure coating method, a roll coating method, a die coating method, a bar coating method, a curtain coating method and a spray coating method.

In the present invention, the drying and curing conditions used upon forming the coating layer on the polyester film are not particularly limited. For example, in the case where the coating layer is formed by an off-line coating method, the coating layer may be subjected to heat-setting usually at a temperature of 80 to 200° C. for 3 to 40 sec and preferably at a temperature of 100 to 180° C. for 3 to 40 sec.

On the other hand, in the case where the coating layer is formed by an in-line coating method, the coating layer may be subjected to heat-setting usually at a temperature of 70 to 270° C. for 3 to 200 sec.

In any of the off-line coating and in-line coating methods, the heat-setting may be used in combination with irradiation with active energy rays such as irradiation with ultraviolet rays, if required. The polyester film constituting the polyester film of the present invention may be previously subjected to surface treatments such as corona treatment and plasma treatment.

The polyester film according to the present invention can be used in the applications requiring an excellent transparency. The internal haze of the polyester film is preferably in the range of 0.0 to 1.0%, more preferably 0.0 to 0.5%, and still more preferably 0.0 to 0.3%. When the internal haze of the polyester film is more than 1.0%, the resulting film tends to fails to exhibit a sufficiently reduced haze even when forming various surface functional layers on the film, and therefore tends to still have a whitish appearance, so that it is not possible to attain a sufficient visibility of the film.

The haze of the polyester film according to the present invention may be reduced in terms of a surface haze thereof by forming various surface functional layers on the film, and therefore is not particularly limited, and is preferably in the range of 0.0 to 2.0%, more preferably 0.0 to 1.5%, and still more preferably 0.0 to 1.0%. When the haze of the polyester film is more than 2.0%, the resulting film tends to have a poor appearance, or the haze thereof tends to be hardly reduced to a sufficient extent even by forming various surface functional layers on the film, resulting in insufficient visibility of the film.

In the case where the polyester film is used in the applications in which it is required to suppress occurrence of interference fringes when forming a surface functional layer such as a hard coat layer on the film, the above second coating layer is suitably controlled in its refractive index, more specifically, designed such that the refractive index (1.55 to 1.65) of the second coating layer is near a geometrical mean value of a refractive index (1.60 to 1.70) of the polyester film as the base material and a refractive index (1.45 to 1.65) of the surface functional layer such as a hard coat layer. The refractive index of the coating layer has a close relationship with a reflectance of the coating layer. When using the polyester film in the applications intended by the present invention, the absolute reflectance of the second coating layer is adjusted such that when preparing a graph by plotting a wavelength on an abscissa axis thereof and a reflectance on an ordinate axis thereof, one minimum value of the reflectance is preferably observed on a characteristic curve thereof in the wavelength range of 400 to 800 nm, and the absolute reflectance at the minimum value of the second coating layer is not less than 4.0%. Within the range of the absolute reflectance as defined in the present invention, if the minimum value is observed in the same wavelength range, the reflectance at the minimum value becomes a high value when the refractive index thereof is high, and becomes a low value when the refractive index thereof is low.

The absolute reflectance of the second coating layer is controlled such that one minimum value thereof is preferably present in the wavelength range of 400 to 800 nm, and more preferably the one minimum value is present in the wavelength range of 500 to 700 nm. The reflectance value at the minimum value preferably lies within the range of 4.0 to 6.5% and more preferably 4.5 to 6.2%. In the case where the number of the minimum values being present in the wavelength range of 400 to 800 nm is not one or in the case where the absolute reflectance at the minimum value is out of the above-specified range, interference fringes tend to be caused after forming the surface functional layer such as a hard coat layer on the coating layer, so that the resulting film tends to be deteriorated in visibility.

In the case where the second coating layer is provided thereon with a surface functional layer such as a hard coat layer, examples of the material used for forming the hard coat layer include, but are not particularly limited to, cured products of monofunctional (meth)acrylates, polyfunctional (meth)acrylates and reactive silicon compounds such as tetraethoxysilane. Among these materials, from the viewpoint of satisfying both a good productivity and a high hardness, especially preferred are cured products obtained by polymerizing compositions comprising active energy ray-curable (meth)acrylates.

The compositions comprising the above active energy ray-curable (meth)acrylates are not particularly limited. For example, there may be used a composition prepared by mixing one or more kinds of conventionally known active energy ray-curable monofunctional (meth)acrylates, bifunctional (meth)acrylates and polyfunctional (meth)acrylates, a composition commercially available as an active energy ray-curable hard coat resin material, or a composition prepared by further adding the other components to the above compositions in such a range that the effects and objects of the present invention are not adversely influenced thereby.

The active energy ray-curable monofunctional (meth)acrylates are not particularly limited. Examples of the active energy ray-curable monofunctional (meth)acrylates include alkyl (meth)acrylates such as methyl (meth)acrylate, n-butyl (meth)acrylate, 2-ethylhexyl (meth)acrylate, lauryl (meth)acrylate, stearyl (meth)acrylate, cyclohexyl (meth)acrylate and isobornyl (meth)acrylate; hydroxyalkyl (meth)acrylates such as hydroxyethyl (meth)acrylate, hydroxypropyl (meth)acrylate and hydroxybutyl (meth)acrylate; alkoxyalkyl (meth)acrylates such as methoxyethyl (meth)acrylate, ethoxyethyl (meth)acrylate, methoxypropyl (meth)acrylate and ethoxypropyl (meth)acrylate; aromatic (meth)acrylates such as benzyl (meth)acrylate and phenoxyethyl (meth)acrylate; amino group-containing (meth)acrylates such as diaminoethyl (meth)acrylate and diethylaminoethyl (meth)acrylate; ethyleneoxide-modified (meth)acrylates such as methoxyethylene glycol (meth)acrylate, phenoxypolyethylene glycol (meth)acrylate and phenyl phenol ethyleneoxide-modified (meth)acrylate; and glycidyl (meth)acrylate, tetrahydrofurfuryl (meth)acrylate and (meth)acrylic acid.

The active energy ray-curable bifunctional (meth)acrylates are not particularly limited. Examples of the active energy ray-curable bifunctional (meth)acrylates include alkanediol di(meth)acrylates such as 1,4-butanediol di(meth)acrylate, neopentyl glycol di(meth)acrylate, 1,6-hexanediol di(meth)acrylate, 1,9-nonanediol di(meth)acrylate and tricyclodecanedimethanol di(meth)acrylate; bisphenol-modified di(meth)acrylates such as bisphenol A ethyleneoxide-modified di(meth)acrylate and bisphenol F ethyleneoxide-modified di(meth)acrylate; and polyethylene glycol di(meth)acrylate, polypropylene glycol di(meth)acrylate, urethane di(meth)acrylate and epoxy di(meth)acrylate.

The active energy ray-curable polyfunctional (meth)acrylates are not particularly limited. Examples of the active energy ray-curable polyfunctional (meth)acrylates include dipentaerythritol hexa(meth)acrylate, pentaerythritol tetra(meth)acrylate, ditrimethylol propane tetra(meth)acrylate, pentaerythritol tri(meth)acrylate, trimethylol propane tri(meth)acrylate, isocyanuric acid-modified tri(meth)acrylates such as isocyanuric acid ethyleneoxide-modified tri(meth)acrylate and ε-caprolactone-modified tris(acryloxyethyl)isocyanurate, and urethane acrylates such as a pentaerythritol triacrylate hexamethylene diisocyanate urethane prepolymer, a pentaerythritol triacrylate toluene diisocyanate urethane prepolymer and a dipentaerythritol pentaacrylate hexamethylene diisocyanate urethane prepolymer.

The other components which may be contained in the compositions comprising the active energy ray-curable (meth)acrylates are not particularly limited. Examples of the other components include inorganic or organic fine particles, polymerization initiators, polymerization inhibitors, antioxidants, antistatic agents, dispersants, surfactants, light stabilizers and leveling agents. In addition, when drying the film formed by a wet coating method, an optional amount of a solvent may be added thereto, if required.

As the method of forming the hard coat layer using an organic material, there may be adopted general wet coating methods such as a roll coating method and a die coating method. The thus formed hard coat layer may be subjected to curing reaction, if required, by heating or by irradiating an active energy ray such as an ultraviolet ray and an electron beam thereto. Meanwhile, the refractive index of the surface functional layer formed on the coating layer is in general in the range of 1.45 to 1.65 as described previously.

EXAMPLES

The present invention is described in more detail below by Examples. However, these Examples are only illustrative and not intended to limit the present invention thereto, and other changes or modifications are also possible unless they depart from the scope of the present invention. In addition, the measuring and evaluating methods used in the present invention are as follows.

(1) Method of Measuring Intrinsic Viscosity of Polyester:

One gram of a polyester from which the other polymer components incompatible with the polyester and pigments were previously removed was accurately weighed, and mixed with and dissolved in 100 mL of a mixed solvent comprising phenol and tetrachloroethane at a weight ratio of 50:50, and a viscosity of the resulting solution was measured at 30° C.

(2) Method of Measuring Average Particle Diameter of Particles:

Using an electron microscope ("S-4500" manufactured by Hitachi), the film was observed to measure particle diameters of 10 particles therein and calculate an average particle diameter thereof from the measured values. Meanwhile, the average particle diameter of the non-heat-resistant particles were measured by observing the film before subjected to the high-temperature step, i.e., after the longitudinal stretching step but before the lateral stretching step.

(3) Method of Measuring Thickness of Coating Layer:

The surface of the coating layer was dyed with $RuO_4$, and the resulting film was embedded in an epoxy resin. Thereafter, the resin-embedded film was cut into a piece by an ultrathin sectioning method, and the cut piece was dyed with $RuO_4$ to observe and measure a cut section of the coating layer using TEM ("H-7650" manufactured by Hitachi High-Technologies; accelerated voltage: 100 V).

(4) Method of Measuring Internal Haze:

Using a haze meter "HZ-2" manufactured by Suga Test Instruments Co., Ltd., the film was immersed in ethanol to measure an internal haze thereof according to JIS K 7136.

(5) Method of Measuring Haze:

Using a haze meter "HM-150" manufactured by Murakami Color Research Laboratory Co., Ltd., the haze was measured according to JIS K 7136.

(6) Roughness of Surface of Film:

Using a 3D non-contact surface profile measurement system ("MN537N-M100" manufactured by Ryoka System Inc.), the roughness Sa of the film was measured on its surface side subjected to cooling and solidification before subjected to the high-temperature step, i.e., after the longitudinal stretching step but before the lateral stretching step. When Sa is less than 5 nm, the film tends to be deteriorated in slipping property and therefore tends to suffer from occurrence of flaws when contacted with rolls or the like in the stretching steps, etc. The roughness of the surface of the film is more preferably not less than 5 nm.

(7) Method of Evaluating Transparency:

The film was observed under light from a three band fluorescent lamp. The results were evaluated according to the following ratings.

A: No feel of traces of particles (spots owing to the particles present in the film) was present, and clear feel was attained; and B: Feel of traces of particles was present, and the film looked whitely.

(8) Method of Evaluating Absolute Reflectance from Surface of Second Coating Layer Formed on Polyester Film:

For the purpose of suppressing reflection of light from a back surface of the polyester film upon measuring an absolute reflectance on one surface of the polyester film, a black tape ("Vinyl Tape VT-50" produced by Nichiban Co., Ltd.) was previously attached to the back surface of the polyester film which was opposite to its surface to be measured, and the surface of a coating layer formed on the measuring surface of the polyester film was subjected to measurement for an absolute reflectance thereof in a wavelength range of 400 to 800 nm using a spectrophotometer (an ultraviolet/visible spectrophotometer "V-570" and an automatic absolute reflectance analyzer "ARM-500N" both manufactured by JASCO Corp.) under the conditions of a synchronous mode; incident angle: 5°; N-polarization; response: Fast; data sampling interval: 1.0 nm; band width: 10 nm; and scanning speed: 1000 m/min, to thereby evaluate a wavelength at a minimum value of the absolute reflectance (bottom wavelength) as well as a reflectance at the minimum value.

(9) Method of Evaluating Interference Fringes:

A coating solution prepared by mixing 72 parts by weight of dipentaerythritol hexaacrylate, 18 parts by weight of 2-hydroxy-3-phenoxypropyl acrylate, 10 parts by weight of antimony pentaoxide, 1 part by weight of a photopolymerization initiator ("IRGACURE 184" (tradename) produced by Ciba Specialty Chemicals Corp.) and 200 parts by weight of methyl ethyl ketone was applied on the second coating layer formed on the polyester film such that a coating thickness thereof after drying was 5 µm, and cured by irradiating an ultraviolet ray thereto to thereby form a hard coat layer. The resulting film was visually observed under irradiation with light using a three band fluorescent lamp to determine whether or not any interference fringes were recognized. The observation results were evaluated according to the following ratings:

A: No interference fringes were recognized.

B: Thin and scattered interference fringes were recognized.

C: Thin but linear interference fringes were recognized.

D: Clear interference fringes were recognized.

(10) Method of Evaluating Adhesion Property 1 of Second Coating Layer:

The film obtained in the above evaluation (9) on which the hard coat layer was formed was subjected to cross-cutting to form 100 (10×10) cross-cuts on the hard coat layer. A 18 mm-wide tape ("Cellotape (registered trademark) CT-18" produced by Nichiban Co., Ltd.) was attached onto the thus cross-cut hard coat layer, and then rapidly peeled off therefrom at a peel angle of 180°. Then, the surface of the hard coat layer from which the tape was peeled off was observed to measure an area of the hard coat layer peeled off together with the tape. The evaluation ratings are as follows.

A: Peeled area of the hard coat layer was less than 10%.

B: Peeled area of the hard coat layer was not less than 10% but less than 50%.

C: Peeled area of the hard coat layer was not less than 50%.

(11) Method of Evaluating Adhesion Property 2 of Second Coating Layer:

In order to evaluate an adhesion property of the coating layer more strictly, studies have been conducted using a material obtained by excluding antimony pentaoxide from the hard coat layer coating solution used in the above evaluation (9). More specifically, a coating solution prepared by mixing 80 parts by weight of dipentaerythritol hexaacrylate, 20 parts by weight of 2-hydroxy-3-phenoxypropyl acrylate, 5 part by weight of a photopolymerization initiator ("IRGACURE 184" (tradename) produced by Ciba Specialty Chemicals Corp.) and 200 parts by weight of methyl ethyl ketone was applied on the second coating layer formed on the polyester film such that a coating thickness thereof after drying was 5 μm, and cured by irradiating an ultraviolet ray thereto to thereby form a hard coat layer. The thus obtained film was allowed to stand under environmental conditions of 80° C. and 90% RH for 100 hr. Thereafter, the resulting hard coat layer was subjected to cross-cutting to form 100 (10×10) cross-cuts thereon. A 18 mm-wide tape ("Cellotape (registered trademark) CT-18" produced by Nichiban Co., Ltd.) was attached onto the thus cross-cut hard coat layer, and then rapidly peeled off therefrom at a peel angle of 180°. Then, the surface of the hard coat layer from which the tape was peeled off was observed to measure an area of the hard coat layer peeled off together with the tape. The evaluation ratings are as follows.

A: Peeled area of the hard coat layer was less than 3%.

B: Peeled area of the hard coat layer was not less than 3% but less than 10%.

C: Peeled area of the hard coat layer was not less than 10% but less than 50%.

D: Peeled area of the hard coat layer was not less than 50%.

The polyesters used in the respective Examples and Comparative Examples were prepared by the following methods.

<Method for Producing Polyester (A)>

One hundred parts by weight of dimethyl terephthalate and 60 parts by weight of ethylene glycol as well as ethyl acid phosphate and magnesium acetate tetrahydrate as a catalyst in amounts of 30 ppm and 100 ppm, respectively, based on the polyester as produced, were subjected to esterification reaction at 260° C. in a nitrogen atmosphere. Successively, tetrabutyl titanate in an amount of 50 ppm based on the polyester as produced was added to the reaction solution. While heating the resulting mixture to 280° C. over 2 hr and 30 min, the pressure of the reaction system was reduced to an absolute pressure of 0.3 kPa, and further the mixture was subjected to melt-polycondensation for 80 min, thereby obtaining a polyester (A) having an intrinsic viscosity of 0.63.

<Method for Producing Polyester (B)>

One hundred parts by weight of dimethyl terephthalate and 60 parts by weight of ethylene glycol as well as magnesium acetate tetrahydrate as a catalyst in an amount of 900 ppm based on the polyester as produced, were subjected to esterification reaction at 225° C. in a nitrogen atmosphere. Successively, orthophosphoric acid and germanium dioxide in amounts of 3500 ppm and 70 ppm, respectively, based on the polyester as produced, were added to the reaction solution. While heating the resulting mixture to 280° C. over 2 hr and 30 min, the pressure of the reaction system was reduced to an absolute pressure of 0.4 kPa, and further the mixture was subjected to melt-polycondensation for 85 min, thereby obtaining a polyester (B) having an intrinsic viscosity of 0.64.

<Method for Producing Polyester (C)>

The same procedure as used in the above method for producing the polyester (A) was conducted except that silica particles having an average particle diameter of 0.1 μm were added in an amount of 0.5% by weight based on the polyester as produced before the melt-polycondensation, thereby obtaining a polyester (C).

<Method for Producing Polyester (D)>

The same procedure as used in the above method for producing the polyester (A) was conducted except that silica particles having an average particle diameter of 3.2 μm were added in an amount of 0.5% by weight based on the polyester as produced before the melt-polycondensation, thereby obtaining a polyester (D).

Examples of the non-heat-resistant particles and the compounds constituting the coating layer are as follows.

(Examples of Compounds)

Non-Heat-Resistant Particles: (IA)

Non-heat-resistant non-crosslinked acrylic particles having an average particle diameter of 0.09 μm, a softening point of 210° C. and a glass transition point of 60° C. which was produced by copolymerizing a composition comprising methyl methacrylate and butyl acrylate at a ratio of 80/20.

Non-Heat-Resistant Particles: (IB)

Non-heat-resistant non-crosslinked styrene/acrylic resin particles having an average particle diameter of 0.37 μm, a softening point of 220° C. and a glass transition point of 110° C. which was produced by copolymerizing a composition comprising methyl methacrylate and styrene at a ratio of 70/30.

Silica Particles: (IC)

Silica particles having an average particle diameter of 0.30 μm

Silica Particles: (ID)

Silica particles having an average particle diameter of 0.07 μm

Silica Particles: (IE)

Silica particles having an average particle diameter of 0.15 μm

Polyester Resin: (IIA)

Water dispersion of polyester resin obtained by polymerizing the following composition:

Monomer composition: (acid component) terephthalic acid/isophthalic acid/5-sodium sulfoisophthalic acid//(diol component) ethylene glycol/1,4-butanediol/diethylene glycol=56/40/4//70/20/10 (mol %)

Acrylic Resin: (IIB)

Water dispersion of acrylic resin obtained by polymerizing the following composition:

Emulsion polymer (emulsifier: anionic surfactant) produced from ethyl acrylate/n-butyl acrylate/methyl methacrylate/N-methylol acrylamide/acrylic acid=65/21/10/2/2 (% by weight)

Urethane Resin (IIC):

Carboxylic acid-water-dispersed type polyester polyurethane resin "HYDRAN AP-40" (produced by DIC Corp.)

Polyester Resin Having a Condensed Polycyclic Aromatic Structure: (IID)

Water dispersion of a polyester resin obtained by copolymerizing the following composition:

Monomer composition: (acid component) 2,6-naphthalenedicarboxylic acid/5-sodium sulfoisophthalic acid//(diol component) ethylene glycol/diethylene glycol=92/8//80/20 (mol %)

Hexamethoxymethyl Melamine (IIIA)
Oxazoline Compound: (IIIB1)
Acrylic polymer having an oxazoline group and a polyalkyleneoxide chain "EPOCROSS WS-500" (produced by Nippon Shokubai Co., Ltd.; polymer of the type comprising 1-methoxy-2-propanol solvent in an amount of about 38% by weight).

Oxazoline Compound: (IIIB2)
Acrylic polymer having an oxazoline group and a polyalkyleneoxide chain "EPOCROSS WS-700" (produced by Nippon Shokubai Co., Ltd.; VOC-free type).

Epoxy Compound: (IIIC1)
Polyglycerol polyglycidyl ether "DECONAL EX-521" (produced by Nagase Chemtex Co., Ltd.)

Epoxy Compound: (IIIC2):
Epoxy resin "DECONAL EX-1410" (produced by Nagase Chemtex Co., Ltd.)

Metal Element-Containing Organic-Compound: (IVA)
Titanium ethanol aminate
Metal Element-Containing Organic Compound: (IVB)
Titanium lactate
Metal Oxide: (VA)
Zirconium oxide particles having an average particle diameter of 15 nm
Metal Oxide: (VB)
Titanium oxide particles having an average particle diameter of 15 nm Example 1

A mixed raw material obtained by mixing the polyesters (A) and (B) in amounts of 97% and 3%, respectively, as a raw material for outermost layers (surface layers), and a mixed raw material obtained by mixing the polyesters (A) and (B) in amounts of 97% and 3%, respectively, as a raw material for an intermediate layer, were respectively charged into two extruders, melted therein at 285° C., and then co-extruded therefrom on a chilled roll whose surface was controlled to a temperature of 40° C. into a two-kind/three-layer structure (surface layer/intermediate layer/surface layer=1:18:1 as output), followed by cooling and solidifying the thus extruded sheet on the chilled roll, thereby obtaining an unstretched film. Then, an aqueous coating solution A1 as shown in Table 1 below was applied onto both surfaces of the unstretched film and then dried, thereby obtaining a film provided on each surface thereof with a coating layer having a thickness (after dried) of 0.2 μm. Next, the thus obtained unstretched sheet was stretched utilizing a difference between peripheral speeds of rolls at 85° C. at a stretching ratio of 3.4 times in a longitudinal direction thereof. Thereafter, an aqueous coating solution B3 shown in Table 2 below was applied on both surfaces of the thus obtained longitudinally stretched film. Then, the resulting coated film was introduced into a tenter where the film was stretched at 120° C. at a stretching ratio of 4.0 times in a lateral direction thereof and then heat-set at 230° C. Next, the obtained stretched sheet was relaxed by 2% in a lateral direction thereof, thereby obtaining a polyester film having a thickness of 125 μm which was provided on each surface thereof with a coating layer having a thickness of 0.05 μm (after dried and stretched). As a result of evaluating the thus obtained polyester film, it was confirmed that the polyester film exhibited a good transparency and a sufficient film roughness after the longitudinal stretching step. The properties of the thus obtained film are shown in Table 3.

Examples 2 to 18

The same procedure as in Example 1 was conducted except that the coating agent composition was changed as shown in Tables 1 and 2, thereby obtaining polyester films. The properties of the thus obtained polyester films are shown in Table 3. As a result, it was confirmed that the polyester films exhibited a good transparency and a sufficient film roughness after the longitudinal stretching step.

Example 19

A mixed raw material obtained by mixing the polyesters (A), (B) and (C) in amounts of 96%, 3% and 1%, respectively, as a raw material for outermost layers (surface layers), and a mixed raw material obtained by mixing the polyesters (A) and (B) in amounts of 97% and 3%, respectively, as a raw material for an intermediate layer, were respectively charged into two extruders, melted therein at 285° C., and then co-extruded therefrom on a chilled roll whose surface was controlled to a temperature of 40° C. into a two-kind/three-layer structure (surface layer/intermediate layer/surface layer=1:18:1 as output), followed by cooling and solidifying the thus extruded sheet on the chilled roll, thereby obtaining an unstretched film. Then, an aqueous coating solution A1 as shown in Table 1 below was applied onto both surfaces of the unstretched film and then dried, thereby obtaining a film provided on each surface thereof with a coating layer having a thickness (after dried) of 0.2 μm. Next, the thus obtained unstretched sheet was stretched utilizing a difference between peripheral speeds of rolls at 85° C. at a stretching ratio of 3.4 times in a longitudinal direction thereof. Thereafter, an aqueous coating solution 83 shown in Table 2 below was applied on both surfaces of the thus obtained longitudinally stretched film. Then, the resulting coated film was introduced into a tenter where the film was stretched at 120° C. at a stretching ratio of 4.0 times in a lateral direction thereof and then heat-set at 230° C. Next, the obtained stretched sheet was relaxed by 2% in a lateral direction thereof, thereby obtaining a polyester film having a thickness of 125 μm which was provided on each surface thereof with a coating layer having a thickness of 0.05 μm (after dried and stretched). As a result of evaluating the thus obtained polyester film, it was confirmed that the polyester film exhibited a good transparency and a sufficient film roughness after the longitudinal stretching step. The properties of the thus obtained film are shown in Table 3.

Comparative Example 1

The same procedure as in Example 1 was conducted except that no coating layer was formed on the unstretched film (no-non-heat-resistant particles were supported on the unstretched film), thereby obtaining a polyester film. As a result of evaluating the thus obtained polyester film, the properties thereof were as shown in Table 3, i.e., it was confirmed that the polyester film exhibited an insufficient film roughness after the longitudinal stretching step, and there was such a fear that the film was readily damaged.

Comparative Examples 2 and 3

The same procedure as in Example 1 was conducted except that the coating agent composition was changed as shown in Tables 1 and 2, thereby obtaining polyester films. As a result of evaluating the thus obtained polyester films, the properties thereof were as shown in Table 3, i.e., it was confirmed that some of the polyester films had a high haze and a whitish appearance, and some other thereof exhibited an insufficient film roughness after the longitudinal stretching step.

Comparative Example 4

A mixed raw material obtained by mixing the polyesters (A), (B) and (D) in amounts of 92%, 3% and 5%, respectively, as a raw material for outermost layers (surface layers), and a mixed raw material obtained by mixing the polyesters (A) and (B) in amounts of 97% and 3%, respectively, as a raw material for an intermediate layer, were respectively charged into two extruders, melted therein at 285° C., and then co-extruded therefrom on a chilled roll whose surface was controlled to a temperature of 40° C. into a two-kind/three-layer structure (surface layer/intermediate layer/surface layer=1:18:1 as output), followed by cooling and solidifying the thus extruded sheet on the chilled roll, thereby obtaining an unstretched film. Next, the thus obtained unstretched sheet was stretched utilizing a difference between peripheral speeds of rolls at 85° C. at a stretching ratio of 3.4 times in a longitudinal direction thereof. Thereafter, an aqueous coating solution B3 shown in Table 2 below was applied on both surfaces of the thus obtained longitudinally stretched film. Then, the resulting coated film was introduced into a tenter where the film was stretched at 120° C. at a stretching ratio of 4.0 times in a lateral direction thereof and then heat-set at 230° C. Next, the obtained stretched sheet was relaxed by 2% in a lateral direction thereof, thereby obtaining a polyester film having a thickness of 125 μm which was provided on each surface thereof with a coating layer having a thickness of 0.05 μm (after dried and stretched). As a result of evaluating the thus obtained polyester film, it was confirmed that the polyester film exhibited a good film roughness after the longitudinal stretching step and a good slipping property, but had a feel of grains when observed and a whitish appearance. The properties of the thus obtained film are shown in Table 3.

TABLE 1

| Coating solution | Coating agent composition (wt %) based on nonvolatile components | | | | | | | | |
|---|---|---|---|---|---|---|---|---|---|
| | IA | IB | IC | IIA | IIB | IIC | IIIA | IIIB1 | IIIC1 |
| A1 | 2 | 0 | 0 | 98 | 0 | 0 | 0 | 0 | 0 |
| A2 | 0 | 2 | 0 | 98 | 0 | 0 | 0 | 0 | 0 |
| A3 | 2 | 0 | 0 | 0 | 98 | 0 | 0 | 0 | 0 |
| A4 | 2 | 0 | 0 | 0 | 0 | 98 | 0 | 0 | 0 |
| A5 | 2 | 0 | 0 | 88 | 0 | 0 | 10 | 0 | 0 |
| A6 | 2 | 0 | 0 | 88 | 0 | 0 | 0 | 10 | 0 |
| A7 | 2 | 0 | 0 | 78 | 0 | 0 | 0 | 10 | 10 |
| A8 | 5 | 0 | 0 | 90 | 0 | 0 | 5 | 0 | 0 |
| A9 | 5 | 0 | 0 | 95 | 0 | 0 | 0 | 0 | 0 |
| A10 | 10 | 0 | 0 | 90 | 0 | 0 | 0 | 0 | 0 |
| A11 | 30 | 0 | 0 | 70 | 0 | 0 | 0 | 0 | 0 |
| A12 | 0 | 1 | 0 | 94 | 0 | 0 | 5 | 0 | 0 |
| A13 | 0 | 3 | 0 | 77 | 0 | 0 | 0 | 10 | 10 |
| A14 | 0 | 5 | 0 | 95 | 0 | 0 | 0 | 0 | 0 |
| A15 | 0 | 0 | 5 | 95 | 0 | 0 | 0 | 0 | 0 |
| A16 | 0 | 0 | 0 | 0 | 100 | 0 | 0 | 0 | 0 |

TABLE 2

| Coating solution | Coating agent composition (wt %) based on nonvolatile components | | | | | |
|---|---|---|---|---|---|---|
| | ID | IIA | IIB | IIC | IIIB1 | IIIC1 |
| B1 | 3 | 97 | 0 | 0 | 0 | 0 |
| B2 | 3 | 47 | 0 | 50 | 0 | 0 |
| B3 | 3 | 57 | 20 | 0 | 10 | 10 |

TABLE 3

| | Unstretched film | | | Longitudinally stretched film | |
|---|---|---|---|---|---|
| Examples and Comp. Examples | Coating solution | Coating amount after dried (μm) | Amount of particles disposed on one surface of film after dried (mg/m²) | Coating solution | Coating amount after stretched (μm) |
| Example 1 | A1 | 0.2 | 4 | B3 | 0.05 |
| Example 2 | A1 | 0.6 | 12 | B3 | 0.05 |
| Example 3 | A2 | 0.2 | 4 | B3 | 0.05 |
| Example 4 | A2 | 0.6 | 12 | B3 | 0.05 |
| Example 5 | A3 | 0.2 | 4 | B3 | 0.05 |
| Example 6 | A4 | 0.2 | 4 | B3 | 0.05 |
| Example 7 | A5 | 0.2 | 4 | B3 | 0.05 |
| Example 8 | A6 | 0.2 | 4 | B3 | 0.05 |
| Example 9 | A7 | 0.2 | 4 | B3 | 0.05 |
| Example 10 | A8 | 0.2 | 10 | B3 | 0.05 |
| Example 11 | A9 | 0.6 | 30 | B3 | 0.05 |
| Example 12 | A10 | 0.2 | 20 | B3 | 0.05 |
| Example 13 | A11 | 0.2 | 60 | B3 | 0.05 |
| Example 14 | A12 | 0.2 | 2 | B3 | 0.05 |
| Example 15 | A13 | 0.2 | 6 | B3 | 0.05 |
| Example 16 | A14 | 0.6 | 30 | B3 | 0.05 |
| Example 17 | A1 | 0.2 | 4 | B1 | 0.05 |
| Example 18 | A1 | 0.2 | 4 | B2 | 0.05 |
| Example 19 | A1 | 0.2 | 4 | B3 | 0.05 |
| Comp. Example 1 | — | — | — | B3 | 0.05 |
| Comp. Example 2 | A15 | 0.6 | 30 | B3 | 0.05 |
| Comp. Example 3 | A16 | 0.2 | 0 | B3 | 0.05 |
| Comp. Example 4 | — | — | — | B3 | 0.05 |

| Examples and Comp. Examples | Internal haze (%) | Haze (%) | Roughness Sa (nm) | Transparency |
|---|---|---|---|---|
| Example 1 | 0.2 | 0.2 | 7 | A |
| Example 2 | 0.2 | 0.2 | 9 | A |
| Example 3 | 0.2 | 0.2 | 8 | A |
| Example 4 | 0.2 | 0.2 | 10 | A |
| Example 5 | 0.2 | 0.2 | 7 | A |
| Example 6 | 0.2 | 0.2 | 7 | A |
| Example 7 | 0.2 | 0.2 | 7 | A |
| Example 8 | 0.2 | 0.2 | 7 | A |
| Example 9 | 0.2 | 0.2 | 7 | A |
| Example 10 | 0.2 | 0.2 | 8 | A |
| Example 11 | 0.2 | 0.2 | 12 | A |
| Example 12 | 0.2 | 0.2 | 10 | A |
| Example 13 | 0.2 | 0.2 | 14 | A |
| Example 14 | 0.2 | 0.2 | 7 | A |
| Example 15 | 0.2 | 0.2 | 8 | A |
| Example 16 | 0.2 | 0.3 | 15 | A |
| Example 17 | 0.2 | 0.2 | 7 | A |
| Example 18 | 0.2 | 0.2 | 7 | A |
| Example 19 | 0.2 | 0.2 | 7 | A |
| Comp. Example 1 | 0.2 | 0.2 | 3 | A |
| Comp. Example 2 | 0.2 | 2.8 | 15 | B |
| Comp. Example 3 | 0.2 | 0.2 | 4 | A |

TABLE 3-continued

| | | | | |
|---|---|---|---|---|
| Example 3 Comp. Example 4 | 0.6 | 1.3 | 5 | B |

Examples 20 and 42

The same procedure as in Example 1 was conducted except that the coating agent composition was changed as shown in Tables 1, 4 and 5, thereby obtaining polyester films. As a result of evaluating the thus obtained polyester films, the properties thereof were as shown in Table 6, i.e., it was confirmed that the polyester films exhibited a good transparency and a sufficient film roughness after the longitudinal stretching step, and occurrence of interference fringes on the film after forming the hard coat layer thereon was well suppressed.

Example 43

The same procedure as in Example 19 was conducted except that the coating agent composition was changed as shown in Tables 1, 4 and 5, thereby obtaining a polyester film. As a result of evaluating the thus obtained polyester film, the properties thereof were as shown in Table 6, i.e., it was confirmed that the polyester film exhibited a good transparency and a sufficient film roughness after the longitudinal stretching step, and occurrence of interference fringes on the film after forming the hard coat layer thereon was suppressed at a good level.

Comparative Example 5

The same procedure as in Example 1 was conducted except that no coating layer was formed on the unstretched film (no non-heat-resistant particles were supported on the unstretched film), thereby obtaining a polyester film. As a result of evaluating the thus obtained polyester film, the properties thereof were as shown in Table 6, i.e., it was confirmed that the polyester film exhibited an insufficient film roughness after the longitudinal stretching step, and there was such a fear that the film was readily damaged.

Comparative Examples 6 and 7

The same procedure as in Example 1 was conducted except that the coating agent composition was changed as shown in Tables 1, 4 and 5, thereby obtaining polyester films. As a result of evaluating the thus obtained polyester films, the properties thereof were as shown in Table 6, i.e., it was confirmed that some of the polyester films had a high haze and a whitish appearance, and some other thereof exhibited an insufficient film roughness after the longitudinal stretching step or suffered from occurrence of clear interference fringes on the film when observed.

Comparative Example 8

The same procedure as in Comparative Example 4 was conducted except that the coating agent composition was changed as shown in Tables 4 and 5, thereby obtaining a polyester film. As a result, it was confirmed that the polyester film exhibited a feel of grains when observed and a whitish appearance. The properties of the thus obtained polyester film are shown in Table 6.

TABLE 4

| Coating solution | Coating agent composition (wt %) based on nonvolatile components | | | | | | | |
|---|---|---|---|---|---|---|---|---|
| | IIA | IIC | IID | IIIA | IIIB1 | IVA | IVB | ID |
| C1 | 17 | 15 | 35 | 30 | 0 | 0 | 0 | 3 |
| C2 | 35 | 0 | 42 | 20 | 0 | 0 | 0 | 3 |
| C3 | 47 | 0 | 50 | 0 | 0 | 0 | 0 | 3 |
| C4 | 67 | 0 | 30 | 0 | 0 | 0 | 0 | 3 |
| C5 | 0 | 0 | 52 | 0 | 0 | 30 | 15 | 3 |
| C6 | 32 | 0 | 20 | 0 | 0 | 30 | 15 | 3 |
| C7 | 35 | 17 | 0 | 0 | 0 | 30 | 15 | 3 |
| C8 | 82 | 0 | 0 | 0 | 15 | 0 | 0 | 3 |

TABLE 5

| Examples and Comp. Examples | Unstretched film | | | Longitudinally stretched film | |
|---|---|---|---|---|---|
| | Coating solution | Coating amount after dried (μm) | Amount of particles disposed on one surface of film after dried (mg/m$^2$) | Coating solution | Coating amount after stretched (μm) |
| Example 20 | A1 | 0.2 | 4 | C1 | 0.10 |
| Example 21 | A1 | 0.6 | 12 | C1 | 0.10 |
| Example 22 | A2 | 0.2 | 4 | C1 | 0.10 |
| Example 23 | A2 | 0.6 | 12 | C1 | 0.10 |
| Example 24 | A3 | 0.2 | 4 | C1 | 0.10 |
| Example 25 | A4 | 0.2 | 4 | C1 | 0.10 |
| Example 26 | A5 | 0.2 | 4 | C1 | 0.10 |
| Example 27 | A6 | 0.2 | 4 | C1 | 0.10 |
| Example 28 | A7 | 0.2 | 4 | C1 | 0.10 |
| Example 29 | A8 | 0.2 | 10 | C1 | 0.10 |
| Example 30 | A9 | 0.6 | 30 | C1 | 0.10 |
| Example 31 | A10 | 0.2 | 20 | C1 | 0.10 |
| Example 32 | A11 | 0.2 | 60 | C1 | 0.10 |
| Example 33 | A12 | 0.2 | 2 | C1 | 0.10 |
| Example 34 | A13 | 0.2 | 6 | C1 | 0.10 |
| Example 35 | A14 | 0.6 | 30 | C1 | 0.10 |
| Example 36 | A1 | 0.2 | 4 | C2 | 0.10 |
| Example 37 | A1 | 0.2 | 4 | C3 | 0.10 |
| Example 38 | A1 | 0.2 | 4 | C4 | 0.10 |
| Example 39 | A1 | 0.2 | 4 | C5 | 0.10 |
| Example 40 | A1 | 0.2 | 4 | C6 | 0.10 |
| Example 41 | A1 | 0.2 | 4 | C7 | 0.10 |
| Example 42 | A1 | 0.2 | 4 | C8 | 0.10 |
| Example 43 | A1 | 0.2 | 4 | C1 | 0.10 |
| Comp. Example 5 | — | — | — | C1 | 0.10 |
| Comp. Example 6 | A15 | 0.6 | 30 | C1 | 0.10 |
| Comp. Example 7 | A16 | 0.2 | 0 | C1 | 0.10 |
| Comp. Example 8 | — | — | — | C1 | 0.10 |

TABLE 6

| Examples and Comp. Examples | Internal haze (%) | Haze (%) | Roughness Sa (nm) | Transparency |
|---|---|---|---|---|
| Example 20 | 0.2 | 0.3 | 7 | A |
| Example 21 | 0.2 | 0.3 | 9 | A |
| Example 22 | 0.2 | 0.3 | 8 | A |
| Example 23 | 0.2 | 0.3 | 10 | A |
| Example 24 | 0.2 | 0.3 | 7 | A |
| Example 25 | 0.2 | 0.3 | 7 | A |
| Example 26 | 0.2 | 0.3 | 7 | A |
| Example 27 | 0.2 | 0.3 | 7 | A |
| Example 28 | 0.2 | 0.3 | 7 | A |
| Example 29 | 0.2 | 0.3 | 8 | A |

TABLE 6-continued

| Examples and Comp. Examples | | | | |
|---|---|---|---|---|
| Example 30 | 0.2 | 0.3 | 12 | A |
| Example 31 | 0.2 | 0.3 | 10 | A |
| Example 32 | 0.2 | 0.3 | 14 | A |
| Example 33 | 0.2 | 0.3 | 7 | A |
| Example 34 | 0.2 | 0.3 | 8 | A |
| Example 35 | 0.2 | 0.4 | 15 | A |
| Example 36 | 0.2 | 0.3 | 7 | A |
| Example 37 | 0.2 | 0.3 | 7 | A |
| Example 38 | 0.2 | 0.3 | 7 | A |
| Example 39 | 0.2 | 0.3 | 7 | A |
| Example 40 | 0.2 | 0.3 | 7 | A |
| Example 41 | 0.2 | 0.3 | 7 | A |
| Example 42 | 0.2 | 0.3 | 7 | A |
| Example 43 | 0.2 | 0.3 | 7 | A |
| Comp. Example 5 | 0.2 | 0.3 | 3 | A |
| Comp. Example 6 | 0.2 | 2.8 | 15 | B |
| Comp. Example 7 | 0.2 | 0.3 | 4 | A |
| Comp. Example 8 | 0.6 | 1.4 | 5 | B |

| Examples and Comp. Examples | Bottom wavelength (nm) | Minimum value of absolute reflectance (%) | Occurrence of interference fringes | Adhesion property 1 |
|---|---|---|---|---|
| Example 20 | 600 | 4.6 | A | A |
| Example 21 | 600 | 4.6 | A | A |
| Example 22 | 600 | 4.6 | A | A |
| Example 23 | 600 | 4.6 | A | A |
| Example 24 | 600 | 4.6 | A | A |
| Example 25 | 600 | 4.6 | A | A |
| Example 26 | 600 | 4.6 | A | A |
| Example 27 | 600 | 4.6 | A | A |
| Example 28 | 600 | 4.6 | A | A |
| Example 29 | 600 | 4.6 | A | A |
| Example 30 | 600 | 4.6 | A | A |
| Example 31 | 600 | 4.6 | A | A |
| Example 32 | 600 | 4.6 | A | A |
| Example 33 | 600 | 4.6 | A | A |
| Example 34 | 600 | 4.6 | A | A |
| Example 35 | 600 | 4.6 | A | A |
| Example 36 | 600 | 4.6 | A | A |
| Example 37 | 600 | 4.5 | A | A |
| Example 38 | 600 | 4.3 | B | A |
| Example 39 | 600 | 5.4 | A | A |
| Example 40 | 600 | 5.0 | A | A |
| Example 41 | 600 | 4.5 | A | A |
| Example 42 | 600 | 3.8 | D | A |
| Example 43 | 600 | 4.6 | A | A |
| Comp. Example 5 | 600 | 4.6 | A | A |
| Comp. Example 6 | 600 | 4.6 | A | A |
| Comp. Example 7 | 600 | 4.6 | A | A |
| Comp. Example 8 | 600 | 4.6 | A | A |

Examples 44 to 90

The same procedure as in Example 1 was conducted except that the coating agent composition was changed as shown in Tables 1 and 7 to 9, thereby obtaining polyester films. As a result of evaluating the thus obtained polyester films, the properties thereof were as shown in Tables 11 and 12, i.e., it was confirmed that the polyester films exhibited a good transparency and a sufficient film roughness after the longitudinal stretching step, and occurrence of interference fringes on the film after forming the hard coat layer thereon was suppressed at a good level, and the film also had a good adhesion property.

Example 91

The same procedure as in Example 19 was conducted except that the coating agent composition was changed as shown in Tables 1, 7 and 9, thereby obtaining a polyester film. As a result of evaluating the thus obtained polyester film, the properties thereof were as shown in Table 12, i.e., it was confirmed that the polyester film exhibited a good transparency and a sufficient film roughness after the longitudinal stretching step, and occurrence of interference fringes on the film after forming the hard coat layer thereon was suppressed at a good level, and the film also had a good adhesion property.

Comparative Example 9

The same procedure as in Example 1 was conducted except that no coating layer was formed on the unstretched film (no non-heat-resistant particles were supported on the unstretched film), thereby obtaining a polyester film. As a result of evaluating the thus obtained polyester film, the properties thereof were as shown in Table 13, i.e., it was confirmed that the polyester film exhibited an insufficient film roughness after the longitudinal stretching step, and there was such a fear that the film was readily damaged.

Comparative Examples 10 and 11

The same procedure as in Example 1 was conducted except that the coating agent composition was changed as shown in Tables 1, 7 and 10, thereby obtaining polyester films. As a result of evaluating the thus obtained polyester films, the properties thereof were as shown in Table 13, i.e., it was confirmed that some of the polyester films had a high haze and a whitish appearance, and some other thereof exhibited an insufficient film roughness after the longitudinal stretching step or suffered from occurrence of clear interference fringes on the film when observed, or further had a poor adhesion property.

Comparative Example 12

The same procedure as in Comparative Example 4 was conducted except that the coating agent composition was changed as shown in Tables 7 and 10, thereby obtaining a polyester film. As a result, it was confirmed that the polyester film exhibited a feel of grains when observed and a whitish appearance. The properties of the thus obtained polyester film are shown in Table 13.

TABLE 7

| Coating solution | Coating agent composition (wt %) based on nonvolatile components | | | | | | |
|---|---|---|---|---|---|---|---|
| | VA | VB | IIIB1 | IIIB2 | IIIC1 | IIIC2 | IID |
| D1 | 5 | 0 | 15 | 0 | 10 | 0 | 20 |
| D2 | 8 | 0 | 10 | 0 | 10 | 0 | 20 |
| D3 | 10 | 0 | 5 | 0 | 10 | 0 | 35 |
| D4 | 10 | 0 | 5 | 0 | 10 | 0 | 35 |
| D5 | 10 | 0 | 5 | 0 | 10 | 0 | 35 |
| D6 | 10 | 0 | 5 | 0 | 0 | 10 | 35 |
| D7 | 10 | 0 | 10 | 0 | 5 | 0 | 40 |
| D8 | 10 | 0 | 0 | 10 | 5 | 0 | 40 |
| D9 | 10 | 0 | 0 | 10 | 10 | 0 | 10 |
| D10 | 10 | 0 | 5 | 0 | 5 | 0 | 10 |
| D11 | 10 | 0 | 20 | 0 | 20 | 0 | 10 |
| D12 | 15 | 0 | 10 | 0 | 10 | 0 | 15 |
| D13 | 15 | 0 | 10 | 0 | 10 | 0 | 15 |

TABLE 7-continued

| | | | | | | | | |
|---|---|---|---|---|---|---|---|---|
| D14 | 15 | 0 | 10 | 0 | 10 | 0 | 15 | |
| D15 | 20 | 0 | 15 | 0 | 10 | 0 | 15 | |
| D16 | 30 | 0 | 10 | 0 | 10 | 0 | 10 | |
| D17 | 10 | 0 | 15 | 0 | 20 | 0 | 45 | |
| D18 | 10 | 0 | 10 | 0 | 15 | 0 | 35 | |
| D19 | 10 | 0 | 3 | 0 | 10 | 0 | 30 | |
| D20 | 10 | 0 | 5 | 0 | 10 | 0 | 15 | |
| D21 | 10 | 0 | 5 | 0 | 10 | 0 | 15 | |
| D22 | 10 | 0 | 20 | 0 | 20 | 0 | 0 | |
| D23 | 0 | 10 | 15 | 0 | 15 | 0 | 15 | |
| D24 | 0 | 10 | 15 | 0 | 15 | 0 | 15 | |
| D25 | 0 | 10 | 15 | 0 | 15 | 0 | 15 | |
| D26 | 0 | 0 | 20 | 0 | 20 | 0 | 0 | |
| D27 | 10 | 0 | 0 | 0 | 5 | 0 | 10 | |
| D28 | 10 | 0 | 5 | 0 | 0 | 0 | 10 | |
| D29 | 10 | 0 | 0 | 0 | 0 | 0 | 10 | |
| D30 | 10 | 0 | 0 | 0 | 0 | 0 | 10 | |

| Coating solution | Coating agent composition (wt %) based on nonvolatile components | | | | | | |
|---|---|---|---|---|---|---|---|
| | IIA | IIB | IIC | IIIA | ID | IE | IC |
| D1 | 50 | 0 | 0 | 0 | 0 | 0 | 0 |
| D2 | 52 | 0 | 0 | 0 | 0 | 0 | 0 |
| D3 | 40 | 0 | 0 | 0 | 0 | 0 | 0 |
| D4 | 39 | 0 | 0 | 0 | 0 | 1 | 0 |
| D5 | 39.5 | 0 | 0 | 0 | 0 | 0 | 0.5 |
| D6 | 40 | 0 | 0 | 0 | 0 | 0 | 0 |
| D7 | 35 | 0 | 0 | 0 | 0 | 0 | 0 |
| D8 | 35 | 0 | 0 | 0 | 0 | 0 | 0 |
| D9 | 60 | 0 | 0 | 0 | 0 | 0 | 0 |
| D10 | 70 | 0 | 0 | 0 | 0 | 0 | 0 |
| D11 | 40 | 0 | 0 | 0 | 0 | 0 | 0 |
| D12 | 50 | 0 | 0 | 0 | 0 | 0 | 0 |
| D13 | 49.5 | 0 | 0 | 0 | 0 | 0.5 | 0 |
| D14 | 49.7 | 0 | 0 | 0 | 0 | 0 | 0.3 |
| D15 | 40 | 0 | 0 | 0 | 0 | 0 | 0 |
| D16 | 40 | 0 | 0 | 0 | 0 | 0 | 0 |
| D17 | 0 | 10 | 0 | 0 | 0 | 0 | 0 |
| D18 | 0 | 0 | 30 | 0 | 0 | 0 | 0 |
| D19 | 27 | 0 | 20 | 0 | 0 | 0 | 0 |
| D20 | 57 | 0 | 0 | 0 | 3 | 0 | 0 |
| D21 | 59 | 0 | 0 | 0 | 0 | 1 | 0 |
| D22 | 50 | 0 | 0 | 0 | 0 | 0 | 0 |
| D23 | 45 | 0 | 0 | 0 | 0 | 0 | 0 |
| D24 | 44 | 0 | 0 | 0 | 0 | 1 | 0 |
| D25 | 44.5 | 0 | 0 | 0 | 0 | 0 | 0.5 |
| D26 | 60 | 0 | 0 | 0 | 0 | 0 | 0 |
| D27 | 75 | 0 | 0 | 0 | 0 | 0 | 0 |
| D28 | 75 | 0 | 0 | 0 | 0 | 0 | 0 |
| D29 | 70 | 0 | 0 | 10 | 0 | 0 | 0 |
| D30 | 60 | 0 | 0 | 20 | 0 | 0 | 0 |

TABLE 8

| Examples | Unstretched film | | Longitudinally stretched film | |
|---|---|---|---|---|
| | Coating solution | Coating amount after dried (μm) | Amount of particles disposed on one surface of film after dried (mg/m$^2$) | Coating solution | Coating amount after stretched (μm) |
| Example 44 | A1 | 0.2 | 4 | D3 | 0.10 |
| Example 45 | A1 | 0.6 | 12 | D3 | 0.10 |
| Example 46 | A2 | 0.2 | 4 | D3 | 0.10 |
| Example 47 | A2 | 0.6 | 12 | D3 | 0.10 |
| Example 48 | A3 | 0.2 | 4 | D3 | 0.10 |
| Example 49 | A4 | 0.2 | 4 | D3 | 0.10 |
| Example 50 | A5 | 0.2 | 4 | D3 | 0.10 |
| Example 51 | A6 | 0.2 | 4 | D3 | 0.10 |
| Example 52 | A7 | 0.2 | 4 | D3 | 0.10 |
| Example 53 | A8 | 0.2 | 10 | D3 | 0.10 |
| Example 54 | A9 | 0.6 | 30 | D3 | 0.10 |
| Example 55 | A10 | 0.2 | 20 | D3 | 0.10 |
| Example 56 | A11 | 0.2 | 60 | D3 | 0.10 |
| Example 57 | A12 | 0.2 | 2 | D3 | 0.10 |
| Example 58 | A13 | 0.2 | 6 | D3 | 0.10 |
| Example 59 | A14 | 0.6 | 30 | D3 | 0.10 |
| Example 60 | A1 | 0.2 | 4 | D1 | 0.10 |
| Example 61 | A1 | 0.2 | 4 | D2 | 0.10 |
| Example 62 | A1 | 0.2 | 4 | D3 | 0.08 |
| Example 63 | A1 | 0.2 | 4 | D3 | 0.12 |
| Example 64 | A1 | 0.2 | 4 | D4 | 0.10 |
| Example 65 | A1 | 0.2 | 4 | D5 | 0.10 |

TABLE 9

| Examples | Unstretched film | | Longitudinally stretched film | |
|---|---|---|---|---|
| | Coating solution | Coating amount after dried (μm) | Amount of particles disposed on one surface of film after dried (mg/m$^2$) | Coating solution | Coating amount after stretched (μm) |
| Example 66 | A1 | 0.2 | 4 | D6 | 0.10 |
| Example 67 | A1 | 0.2 | 4 | D7 | 0.10 |
| Example 68 | A1 | 0.2 | 4 | D8 | 0.10 |
| Example 69 | A1 | 0.2 | 4 | D9 | 0.10 |
| Example 70 | A1 | 0.2 | 4 | D10 | 0.10 |
| Example 71 | A1 | 0.2 | 4 | D11 | 0.10 |
| Example 72 | A1 | 0.2 | 4 | D12 | 0.10 |
| Example 73 | A1 | 0.2 | 4 | D13 | 0.10 |
| Example 74 | A1 | 0.2 | 4 | D14 | 0.10 |
| Example 75 | A1 | 0.2 | 4 | D15 | 0.10 |
| Example 76 | A1 | 0.2 | 4 | D16 | 0.10 |
| Example 77 | A1 | 0.2 | 4 | D17 | 0.10 |
| Example 78 | A1 | 0.2 | 4 | D18 | 0.10 |
| Example 79 | A1 | 0.2 | 4 | D19 | 0.10 |
| Example 80 | A1 | 0.2 | 4 | D20 | 0.10 |
| Example 81 | A1 | 0.2 | 4 | D21 | 0.10 |
| Example 82 | A1 | 0.2 | 4 | D22 | 0.10 |
| Example 83 | A1 | 0.2 | 4 | D23 | 0.10 |
| Example 84 | A1 | 0.2 | 4 | D24 | 0.10 |
| Example 85 | A1 | 0.2 | 4 | D25 | 0.10 |
| Example 86 | A1 | 0.2 | 4 | D26 | 0.10 |
| Example 87 | A1 | 0.2 | 4 | D27 | 0.10 |
| Example 88 | A1 | 0.2 | 4 | D28 | 0.10 |
| Example 89 | A1 | 0.2 | 4 | D29 | 0.10 |
| Example 90 | A1 | 0.2 | 4 | D30 | 0.10 |
| Example 91 | A1 | 0.2 | 4 | D3 | 0.10 |

TABLE 10

| Comp. Examples | Unstretched film | | Longitudinally stretched film | |
|---|---|---|---|---|
| | Coating solution | Coating amount after dried (μm) | Amount of particles disposed on one surface of film after dried (mg/m$^2$) | Coating solution | Coating amount after stretched (μm) |
| Comp. Example 9 | — | — | — | D1 | 0.10 |

TABLE 10-continued

| | Unstretched film | | | Longitudinally stretched film | |
|---|---|---|---|---|---|
| Comp. Examples | Coating solution | Coating amount after dried (μm) | Amount of particles disposed on one surface of film after dried (mg/m²) | Coating solution | Coating amount after stretched (μm) |
| Comp. Example 10 | A15 | 0.6 | 30 | D3 | 0.10 |
| Comp. Example 11 | A16 | 0.2 | 0 | D3 | 0.10 |
| Comp. Example 12 | — | — | — | D3 | 0.10 |

TABLE 11

| Examples | Internal haze (%) | Haze (%) | Roughness Sa (nm) | Transparency |
|---|---|---|---|---|
| Example 44 | 0.2 | 0.4 | 7 | A |
| Example 45 | 0.2 | 0.4 | 9 | A |
| Example 46 | 0.2 | 0.4 | 8 | A |
| Example 47 | 0.2 | 0.4 | 10 | A |
| Example 48 | 0.2 | 0.4 | 7 | A |
| Example 49 | 0.2 | 0.4 | 7 | A |
| Example 50 | 0.2 | 0.4 | 7 | A |
| Example 51 | 0.2 | 0.4 | 7 | A |
| Example 52 | 0.2 | 0.4 | 7 | A |
| Example 53 | 0.2 | 0.4 | 8 | A |
| Example 54 | 0.2 | 0.4 | 12 | A |
| Example 55 | 0.2 | 0.4 | 10 | A |
| Example 56 | 0.2 | 0.4 | 14 | A |
| Example 57 | 0.2 | 0.4 | 7 | A |
| Example 58 | 0.2 | 0.4 | 8 | A |
| Example 59 | 0.2 | 0.5 | 15 | A |
| Example 60 | 0.2 | 0.4 | 7 | A |
| Example 61 | 0.2 | 0.4 | 7 | A |
| Example 62 | 0.2 | 0.4 | 7 | A |
| Example 63 | 0.2 | 0.4 | 7 | A |
| Example 64 | 0.2 | 0.9 | 7 | A |
| Example 65 | 0.2 | 1.1 | 7 | A |

| Examples | Bottom wavelength (nm) | Minimum value of absolute reflectance (%) | Occurrence of interference fringes | Adhesion property 2 |
|---|---|---|---|---|
| Example 44 | 600 | 4.6 | A | A |
| Example 45 | 600 | 4.6 | A | A |
| Example 46 | 600 | 4.6 | A | A |
| Example 47 | 600 | 4.6 | A | A |
| Example 48 | 600 | 4.6 | A | A |
| Example 49 | 600 | 4.6 | A | A |
| Example 50 | 600 | 4.6 | A | A |
| Example 51 | 600 | 4.6 | A | A |
| Example 52 | 600 | 4.6 | A | A |
| Example 53 | 600 | 4.6 | A | A |
| Example 54 | 600 | 4.6 | A | A |
| Example 55 | 600 | 4.6 | A | A |
| Example 56 | 600 | 4.6 | A | A |
| Example 57 | 600 | 4.6 | A | A |
| Example 58 | 600 | 4.6 | A | A |
| Example 59 | 600 | 4.6 | A | A |
| Example 60 | 600 | 4.2 | B | A |
| Example 61 | 600 | 4.5 | A | A |
| Example 62 | 550 | 5.0 | A | A |
| Example 63 | 670 | 4.9 | A | A |
| Example 64 | 600 | 5.0 | A | A |
| Example 65 | 600 | 5.0 | A | A |

TABLE 12

| Examples | Internal haze (%) | Haze (%) | Roughness Sa (nm) | Transparency |
|---|---|---|---|---|
| Example 66 | 0.2 | 0.4 | 7 | A |
| Example 67 | 0.2 | 0.4 | 7 | A |
| Example 68 | 0.2 | 0.4 | 7 | A |
| Example 69 | 0.2 | 0.4 | 7 | A |
| Example 70 | 0.2 | 0.4 | 7 | A |
| Example 71 | 0.2 | 0.4 | 7 | A |
| Example 72 | 0.2 | 0.4 | 7 | A |
| Example 73 | 0.2 | 0.7 | 7 | A |
| Example 74 | 0.2 | 0.7 | 7 | A |
| Example 75 | 0.2 | 0.5 | 7 | A |
| Example 76 | 0.2 | 0.8 | 7 | A |
| Example 77 | 0.2 | 0.4 | 7 | A |
| Example 78 | 0.2 | 0.4 | 7 | A |
| Example 79 | 0.2 | 0.4 | 7 | A |
| Example 80 | 0.2 | 0.6 | 7 | A |
| Example 81 | 0.2 | 0.9 | 7 | A |
| Example 82 | 0.2 | 0.4 | 7 | A |
| Example 83 | 0.2 | 0.4 | 7 | A |
| Example 84 | 0.2 | 0.9 | 7 | A |
| Example 85 | 0.2 | 1.1 | 7 | A |
| Example 86 | 0.2 | 0.4 | 7 | A |
| Example 87 | 0.2 | 0.4 | 7 | A |
| Example 88 | 0.2 | 0.4 | 7 | A |
| Example 89 | 0.2 | 0.4 | 7 | A |
| Example 90 | 0.2 | 0.4 | 7 | A |
| Example 91 | 0.2 | 0.4 | 7 | A |

| Examples | Bottom wavelength (nm) | Minimum value of absolute reflectance (%) | Occurrence of interference fringes | Adhesion property 2 |
|---|---|---|---|---|
| Example 66 | 600 | 5.0 | A | A |
| Example 67 | 600 | 4.8 | A | A |
| Example 68 | 600 | 4.8 | A | A |
| Example 69 | 590 | 4.6 | A | A |
| Example 70 | 590 | 4.6 | A | A |
| Example 71 | 580 | 4.5 | A | A |
| Example 72 | 590 | 4.8 | A | A |
| Example 73 | 590 | 4.8 | A | A |
| Example 74 | 590 | 4.8 | A | A |
| Example 75 | 600 | 4.8 | A | A |
| Example 76 | 600 | 5.4 | A | A |
| Example 77 | 580 | 4.6 | A | A |
| Example 78 | 590 | 4.7 | A | A |
| Example 79 | 600 | 4.8 | A | A |
| Example 80 | 590 | 4.7 | A | A |
| Example 81 | 590 | 4.7 | A | A |
| Example 82 | 580 | 4.3 | B | A |
| Example 83 | 590 | 4.7 | A | A |
| Example 84 | 590 | 4.7 | A | A |
| Example 85 | 590 | 4.7 | A | A |
| Example 86 | 580 | 3.8 | D | A |
| Example 87 | 600 | 4.8 | A | C |
| Example 88 | 600 | 4.6 | A | B |
| Example 89 | 600 | 4.8 | A | D |
| Example 90 | 580 | 4.9 | A | D |
| Example 91 | 600 | 5.0 | A | A |

TABLE 13

| Comp. Examples | Internal haze (%) | Haze (%) | Roughness Sa (nm) | Transparency |
|---|---|---|---|---|
| Comp. Example 9 | 0.2 | 0.4 | 3 | A |
| Comp. Example 10 | 0.2 | 2.9 | 15 | B |
| Comp. Example 11 | 0.2 | 0.4 | 4 | A |
| Comp. Example 12 | 0.6 | 1.5 | 5 | B |

TABLE 13-continued

| Comp. Examples | Bottom wavelength (nm) | Minimum value of absolute reflectance (%) | Occurrence of interference fringes | Adhesion property 2 |
|---|---|---|---|---|
| Comp. Example 9 | 600 | 5.0 | A | A |
| Comp. Example 10 | 600 | 5.0 | A | A |
| Comp. Example 11 | 600 | 5.0 | A | A |
| Comp. Example 12 | 600 | 5.0 | A | A |

INDUSTRIAL APPLICABILITY

The film of the present invention can be suitably used, for example, in the applications in which an excellent transparency is required, such as film members for transparent electrodes used in touch panels or the like, and molding films.

The invention claimed is:

1. A polyester film comprising non-heat-resistant particles supported thereon and having a thickness of 25 to 300 μm, in which after supporting the non-heat-resistant particles on at least one surface of an unstretched polyester film, the unstretched polyester film is stretched in at least one direction thereof,
    wherein the non-heat-resistant particles are supported on the polyester film by applying the coating solution comprising the non-heat-resistant particles thereonto, and
    wherein after applying the coating solution comprising the non-heat-resistant particles onto at least one surface of the unstretched polyester film and then stretching the unstretched polyester film in at least one direction thereof to form a coating layer thereon, another coating layer prepared from a coating solution comprising a metal oxide and two or more kinds of crosslinking agents, is formed on the coating layer or on a surface of the polyester film opposed to the surface on which the coating layer is formed and the metal oxide is at least one selected from the group consisting of zirconium oxide, titanium oxide, tin oxide, yttrium oxide, antimony oxide, indium oxide, zinc oxide, antimony tin oxide and indium tin oxide.

2. A process for producing a polyester film, comprising the steps of:
    blowing non-heat-resistant particles onto at least one surface of an unstretched polyester film to support the non-heat-resistant particles thereon, or applying a coating solution comprising the non-heat-resistant particles onto at least one surface of the unstretched polyester film to support the non-heat-resistant particles thereon; and then
    stretching the unstretched polyester film in at least one direction thereof such that the polyester film has a thickness of 25 to 300 μm after stretching.

3. The polyester film according to claim 1, wherein the non-heat-resistant particles are supported on the polyester film using a polymer in combination therewith.

4. The polyester film according to claim 1, wherein the haze of the polyester film is 0.0 to 2.0% and after applying the coating solution comprising the non-heat-resistant particles onto at least one surface of the unstretched polyester film and then stretching the unstretched polyester film in at least one direction thereof to form a coating layer thereon, another coating layer having an absolute reflectance having one minimum value in a wavelength range of 400 to 800 nm in which the absolute reflectance at the minimum value is not less than 4.0%, is formed on the coating layer or on a surface of the polyester film opposed to the surface on which the coating layer is formed.

5. The polyester film according to claim 1, wherein the non-heat-resistant particles are non-heat resistant organic particles.

6. The polyester film according to claim 1, wherein the non-heat-resistant particles are non-heat resistant polymer particles.

7. The polyester film according to claim 1, wherein the non-heat-resistant particles are non-heat resistant non-crosslinked polymer particles.

8. The polyester film according to claim 1, wherein the non-heat-resistant particles are non-heat resistant non-crosslinked acrylic particles or non-heat resistant non-crosslinked styrene/acrylic resin particles.

9. The process for producing a polyester film according to claim 2 comprising
    applying the coating solution comprising the non-heat-resistant particles onto at least one surface of the unstretched polyester film to support the non-heat-resistant particles thereon in a coating layer, and
    after stretching the unstretched polyester film, applying a coating solution comprising a metal oxide and two or more kinds of crosslinking agents, on the coating layer having the non-heat-resistant particles or on a surface of the polyester film opposed to the surface on which the coating layer having the non-heat-resistant particles is formed,
    wherein the metal oxide is at least one selected from the group consisting of zirconium oxide, titanium oxide, tin oxide, yttrium oxide, antimony oxide, indium oxide, zinc oxide, antimony tin oxide and indium tin oxide.

10. A polyester film comprising non-heat-resistant particles supported on both surfaces thereof and having a thickness of 25 to 300 μm, in which after supporting the non-heat-resistant particles on at least one surface of an unstretched polyester film, the unstretched polyester film is stretched in at least one direction thereof.

11. The polyester film according to claim 10, wherein after applying the coating solution comprising the non-heat-resistant particles onto at least one surface of the unstretched polyester film and then stretching the unstretched polyester film in at least one direction thereof to form a coating layer thereon, another coating layer prepared from a coating solution comprising a metal oxide and two or more kinds of crosslinking agents, is formed on the coating layer or on a surface of the polyester film opposed to the surface on which the coating layer is formed and the metal oxide is at least one selected from the group consisting of zirconium oxide, titanium oxide, tin oxide, yttrium oxide, antimony oxide, indium oxide, zinc oxide, antimony tin oxide and indium tin oxide.

12. A process for producing a polyester film, comprising the steps of:
    blowing non-heat-resistant particles onto at least one surface of an unstretched polyester film to support the non-heat-resistant particles on both surfaces thereof, or applying a coating solution comprising the non-heat-resistant particles onto both surfaces of the unstretched polyester film to support the non-heat-resistant particles on both surfaces thereof; and then stretching the unstretched polyester film in at least one direction thereof such that the polyester film has a thickness of 25 to 300 μm after stretching.

13. The process for producing a polyester film according to claim 12 comprising applying the coating solution comprising the non-heat-resistant particles onto both surfaces of the unstretched polyester film to support the non-heat-resistant particles thereon in two coating layers, and after stretching the unstretched polyester film, applying a coating solution comprising a metal oxide and two or more kinds of crosslinking agents, on at least one coating layer having the non-heat-resistant particles, wherein the metal oxide is at least one selected from the group consisting of zirconium oxide, titanium oxide, tin oxide, yttrium oxide, antimony oxide, indium oxide, zinc oxide, antimony tin oxide and indium tin oxide.

* * * * *